United States Patent
Sadek et al.

(10) Patent No.: US 10,785,806 B2
(45) Date of Patent: Sep. 22, 2020

(54) ON-DEMAND INTERFERENCE MANAGEMENT

(71) Applicant: QUALCOMM Incorporated, San Diego, CA (US)

(72) Inventors: Ahmed Kamel Sadek, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 15/981,076

(22) Filed: May 16, 2018

(65) Prior Publication Data

US 2018/0338326 A1 Nov. 22, 2018

Related U.S. Application Data

(60) Provisional application No. 62/508,552, filed on May 19, 2017.

(51) Int. Cl.
| | |
|---|---|
| *H04W 74/08* | (2009.01) |
| *H04W 72/08* | (2009.01) |
| *H04W 56/00* | (2009.01) |
| *H04L 5/00* | (2006.01) |

(Continued)

(52) U.S. Cl.
CPC ......... *H04W 74/085* (2013.01); *H04L 5/0073* (2013.01); *H04W 56/0095* (2013.01); *H04W 72/082* (2013.01); *H04W 74/002* (2013.01); *H04W 74/0808* (2013.01); *H04L 5/0023* (2013.01); *H04W 24/02* (2013.01); *H04W 56/0015* (2013.01)

(58) Field of Classification Search
None
See application file for complete search history.

(56) References Cited

U.S. PATENT DOCUMENTS

| | | | |
|---|---|---|---|
| 6,256,486 B1 * | 7/2001 | Barany | H04B 7/005 455/296 |
| 2004/0235527 A1 * | 11/2004 | Reudink | H04W 16/02 455/561 |

(Continued)

FOREIGN PATENT DOCUMENTS

| | | |
|---|---|---|
| WO | WO-2013152631 A1 | 10/2013 |
| WO | WO-2016144506 A1 | 9/2016 |

OTHER PUBLICATIONS

Convida Wireless "Synchronization Signal Burst Design for Initial Access", Agenda Item: 7.1.2.1, Document No. R1-1613007 (Year: 2016).*

Convidia Wireless, "Synchronization Signal Burst Design for Initial Access", Agenda Item: 7.1.2.1 Document No. R1-1613007 (Year: 2016).*

(Continued)

*Primary Examiner* — Jamaal Henson
(74) *Attorney, Agent, or Firm* — Linda G. Gunderson; Holland & Hart LLP

(57) ABSTRACT

Methods, systems, and devices for wireless communication are described. A base station may transmit a first signal; listen, after transmitting the first signal and during a listening interval, for a second signal from a user equipment (UE) affected by the first signal, the second signal being indicative of interference at the first UE; receive the second signal during the listening interval; and initiate an interference management procedure based on receipt of the second signal.

26 Claims, 19 Drawing Sheets

(51) Int. Cl.
*H04W 74/00* (2009.01)
*H04W 24/02* (2009.01)

(56) References Cited

U.S. PATENT DOCUMENTS

| | | | |
|---|---|---|---|
| 2010/0265924 A1* | 10/2010 | Yong | H04B 7/0695 |
| | | | 370/336 |
| 2012/0149362 A1* | 6/2012 | Tooher | H04W 24/10 |
| | | | 455/423 |
| 2015/0373572 A1 | 12/2015 | Sahin et al. | |
| 2016/0037363 A1 | 2/2016 | Kairouz et al. | |
| 2016/0044594 A1 | 2/2016 | Feng et al. | |
| 2016/0269087 A1* | 9/2016 | Subramanian | H04B 7/024 |
| 2016/0286563 A1* | 9/2016 | Shirakata | H04W 16/28 |
| 2016/0364363 A1 | 12/2016 | Wietfeldt | |
| 2017/0181065 A1* | 6/2017 | Svedman | H04J 11/0073 |
| 2017/0181154 A1 | 6/2017 | Zhou et al. | |
| 2019/0158345 A1* | 5/2019 | Lincoln | H04W 52/0245 |

OTHER PUBLICATIONS

Hossein, "Design Aspects of Short-Range Millimeter-Wave Networks: A MAC Layer Perspective" submitted as prior art by the applicant (Year: 2016).*

Shokri-Ghadikolaei H., et al., "Millimeter Wave Cellular Networks: A MAC Layer Perspective", IEEE Transactions on Communications, vol. 63, No. 10, Oct. 1, 2015 (Oct. 1, 2015), pp. 3437-3458, XP055418406, Piscataway, NJ, USA, ISSN: 0090-6778, DOI: 10.1109/TCOMM.2015.2456093.

International Search Report and Written Opinion—PCT/US2018/033257—ISA/EPO—dated Aug. 9, 2018 (174162WO).

Shokri-Ghadikolaei H., et al., "Design Aspects of Short-Range Millimeter-Wave Networks: A MAC Layer Perspective", IEEE Network, IEEE Service Center, New York, NY, US, vol. 30, No. 3, May 1, 2016 (May 1, 2016), pp. 88-96, XP011611037, ISSN: 0890-8044, DOI: 10.1109/MNET.2016.7474349 [retrieved on May 19, 2016].

* cited by examiner

ON-DEMAND INTERFERENCE MANAGEMENT

CROSS REFERENCES

The present Application for Patent claims priority to U.S. Provisional Patent Application No. 62/508,552 by Sadek, et al., entitled "On-Demand Interference Management," filed May 19, 2017, assigned to the assignee hereof and incorporated by reference in its entirety.

BACKGROUND

The following relates generally to wireless communication, and more specifically to on-demand interference management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A wireless node, e.g., base station or UE, may use various interference management techniques to potentially reduce an amount of interference caused by the wireless node on other nodes. One example of an interference management technique involves medium access control. A wireless node may perform medium access control techniques before communicating in a wireless multiple-access communications system. Medium access control techniques, e.g., listen-before-transmission (LBT), provide access to a medium for the wireless node when the wireless node senses that the medium is available. If the medium is not available, due to use of the medium by other nodes, the wireless node may delay its use of the medium. In many wireless multiple-access communications systems, the likelihood of interference is high and so interference management techniques (e.g., LBT) are performed by default.

SUMMARY

Some wireless communication systems that operate within millimeter wave (mmW) bands, rely on a number of antennas and beamforming techniques to increase a link budget between wireless nodes (e.g., between a base station and a user equipment (UE)). These wireless communication systems may experience fewer instances of interference compared to other communication systems (e.g., Long Term Evolution (LTE), wireless local area networks (WLANs), etc.). As a result, constantly applying existing medium access control techniques e.g., listen-before-transmission (LBT), or applying existing medium access control techniques by default in order to mitigate an interference for a UE may result in a constant overhead. In addition, there may be instances in existing wireless communications systems (e.g., LTE, WLAN, etc.) where constant or default use of medium access control techniques may still result in excess overhead.

A base station (e.g., a gNodeB (gNB)) may transmit a synchronization signal burst in multiple directions. In some cases, the base station may configure a listening interval to listen for a signal from a UE. The listening interval may be after the synchronization signal burst. The base station may receive, during the listening interval, a signal from a UE that is affected by the synchronization signal burst transmission. As a result of receiving the signal from the UE during the listening interval, the base station may initiate an interference management procedure, e.g., LBT in association with the UE. Such on-demand initiation of interference management procedures may be applied in a directional manner, or may be applied based on frequency or time. Additionally, signals other than a synchronization signal burst may be used to trigger the signals from the affected UEs.

Alternatively, a UE may experience an interference due to another UE. In this case, a victim UE (i.e., UE experiencing interference) may notify the interfering UE of the interference. The interfering UE may transmit an interference management signal to a base station serving the interfering UE, thus indicating that the interfering UE is initiating an interference management procedure (e.g. LBT). As a result, the base station may participate in an interference management procedure with the interfering UE.

Thus, the present disclosure provides techniques that support on-demand interference management. Initiating an on-demand interference management may reduce overhead and support enhanced coexistence, higher data rates, capacity, and spectral efficiency in wireless systems.

A method of wireless communication at a base station is described. The method may include transmitting a first signal; listening, after transmitting the first signal and during a listening interval, for a second signal from a first UE affected by the first signal, the second signal being indicative of interference at the first UE; receiving the second signal during the listening interval; and initiating an interference management procedure based at least in part on receipt of the second signal.

An apparatus for wireless communication is described. The apparatus may include means for transmitting a first signal; means for listening, after transmitting the first signal and during a listening interval, for a second signal from a first UE affected by the first signal, the second signal being indicative of interference at the first UE; means for receiving the second signal during the listening interval; and means for initiating an interference management procedure based at least in part on receipt of the second signal.

Another apparatus for wireless communication is described. The apparatus may include a processor, memory in electronic communication with the processor, and instructions stored in the memory. The instructions may be operable to cause the processor to transmit a first signal; listen, after transmitting the first signal and during a listening interval, for a second signal from a first UE affected by the first signal, the second signal being indicative of interference at the first UE; receive the second signal during the listening interval; and initiate an interference management procedure based at least in part on receipt of the second signal.

A non-transitory computer readable medium for wireless communication is described. The non-transitory computer-readable medium may include instructions operable to cause a processor to transmit a first signal; listen, after transmitting the first signal and during a listening interval, for a second signal from a first UE affected by the first signal, the second signal being indicative of interference at the first UE; receive the second signal during the listening interval; and initiate an interference management procedure based at least in part on receipt of the second signal.

In some examples of the method, apparatus, and non-transitory computer-readable medium described above, the first signal may be a synchronization signal associated with a synchronization signal burst in multiple directions. Some examples of the method, apparatus, and non-transitory computer-readable medium described above for listening for the second signal may further include processes, features, means, or instructions for listening for the second signal in one or more symbols associated with the multiple directions of the synchronization signal burst.

Some examples of the method, apparatus, and non-transitory computer-readable medium described above for receiving the second signal may further include processes, features, means, or instructions for receiving the second signal in a symbol that corresponds to one of the multiple directions of the synchronization signal burst.

Some examples of the method, apparatus, and non-transitory computer-readable medium described above for initiating the interference management procedure may further include processes, features, means, or instructions for performing the interference management procedure in fewer than all of the multiple directions of the synchronization signal burst, but at least in the one of the multiple directions corresponding to the symbol in which the second signal was received. Some examples of the method, apparatus, and non-transitory computer-readable medium described above may further include processes, features, means, or instructions for determining an offset between the listening interval and the synchronization signal burst.

In some examples of the method, apparatus, and non-transitory computer-readable medium described above, the first signal may be a synchronization signal transmitted using an assigned channel or during an assigned transmission time, or both. Some examples of the method, apparatus, and non-transitory computer-readable medium described above for listening for the second signal may further include processes, features, means, or instructions for listening for the second signal using the assigned channel or during the listening interval which is associated with the assigned transmission time, or both. In some examples of the method, apparatus, and non-transitory computer-readable medium described above, the first signal may be a packet transmission, and wherein the listening interval may be immediately after a transmission time interval of the first signal. In some examples of the method, apparatus, and non-transitory computer-readable medium described above, the interference management procedure includes an LBT procedure in a direction of the first UE based at least in part on a direction of the received second signal. In some examples of the method, apparatus, and non-transitory computer-readable medium described above, the interference management procedure is performed in a direction, a frequency, or timing associated with the received second signal of the first UE.

Some examples of the method, apparatus, and non-transitory computer-readable medium described above may further include processes, features, means, or instructions for receiving an interference management signal from a second UE served by the base station indicating that the second UE is initiating an additional interference management procedure based at least in part on the second UE receiving an additional signal from an additional UE, the additional signal indicative of interference at the additional UE; and participating in the additional interference management procedure with the second UE based at least in part on the received interference management signal.

Some examples of the method, apparatus, and non-transitory computer-readable medium described above may further include processes, features, means, or instructions for performing an LBT procedure in a direction of the second UE based at least in part on a direction of the received interference management signal.

Some examples of the method, apparatus, and non-transitory computer-readable medium described above for receiving the second signal may further include processes, features, means, or instructions for updating a transmission timer for the interference management procedure based at least in part on a receive time of the second signal during the listening interval. Some examples of the method, apparatus, and non-transitory computer-readable medium described above may further include processes, features, means, or instructions for refraining from transmitting to the first UE when the base station is in a contention mode based at least in part on receiving the second signal.

A method of wireless communication at a victim UE is described. The method may include identifying that a first signal from a base station is interfering with communications to or from the victim UE; and transmitting a second signal to the base station during a listening interval in which the base station is listening for the second signal, the second signal indicative of interference at the victim UE.

An apparatus for wireless communication is described. The apparatus may include means for identifying that a first signal from a base station is interfering with communications to or from the apparatus; and means for transmitting a second signal to the base station during a listening interval in which the base station is listening for the second signal, the second signal indicative of interference at the apparatus.

Another apparatus for wireless communication is described. The apparatus may include a processor, memory in electronic communication with the processor, and instructions stored in the memory. The instructions may be operable to cause the processor to identify that a first signal from a base station is interfering with communications to or from the apparatus and transmit a second signal to the base station during a listening interval in which the base station is listening for the second signal, the second signal indicative of interference at the apparatus.

A non-transitory computer readable medium for wireless communication is described. The non-transitory computer-readable medium may include instructions operable to cause a processor to identify that a first signal from a base station is interfering with communications to or from the victim UE and transmit a second signal to the base station during a listening interval in which the base station is listening for the second signal, the second signal indicative of interference at the victim UE.

Some examples of the method, apparatus, and non-transitory computer-readable medium described above for transmitting the second signal to the base station may further include processes, features, means, or instructions for transmitting the second signal in a symbol associated with a direction of the first signal.

Some examples of the method, apparatus, and non-transitory computer-readable medium described above for identifying that the first signal from the base station is interfering with communications to or from the victim UE may further include processes, features, means, or instructions for determining that the first signal or the communications to or from the victim UE satisfy a threshold value.

In some examples of the method, apparatus, and non-transitory computer-readable medium described above, the threshold value is associated with a signal interference to noise ratio (SINR) value or a signal to noise ratio (SNR) of the communications to or from the victim UE. In some examples of the method, apparatus, and non-transitory computer-readable medium described above, transmitting the second signal to the base station is based at least in part on the first signal satisfying the threshold value. In some examples of the method, apparatus, and non-transitory computer-readable medium described above, the second signal comprises a registration response (RRS) signal. In some examples of the method, apparatus, and non-transitory computer-readable medium described above, the second signal comprises an interference power associated with a measurement in the RRS. In some examples of the method, apparatus, and non-transitory computer-readable medium described above, the first signal is associated with a synchronization signal burst. In some examples of the method, apparatus, and non-transitory computer-readable medium described above, the identifying that the first signal from the base station is interfering with communications to or from the victim UE is based at least in part on performing a radio resource monitoring (RRM) measurement of the synchronization signal burst.

A method of wireless communication at a first UE is described. The method may include listening, during a listening interval, for a first signal from a victim UE affected by communications to or from the first UE, the first signal indicative of interference at the victim UE; receiving the first signal during the listening interval; and transmitting an interference management signal to a base station serving the first UE, the interference management signal indicating that the first UE is initiating an interference management procedure based at least in part on the first UE receiving the first signal from the victim UE.

An apparatus for wireless communication is described. The apparatus may include means for listening, during a listening interval, for a first signal from a victim UE affected by communications to or from the apparatus, the first signal indicative of interference at the victim UE; means for receiving the first signal during the listening interval; and means for transmitting an interference management signal to a base station serving the apparatus, the interference management signal indicating that the apparatus is initiating an interference management procedure based at least in part on the apparatus receiving the first signal from the victim UE.

Another apparatus for wireless communication is described. The apparatus may include a processor, memory in electronic communication with the processor, and instructions stored in the memory. The instructions may be operable to cause the processor to listen, during a listening interval, for a first signal from a victim UE affected by communications to or from the apparatus, the first signal indicative of interference at the victim UE; receive the first signal during the listening interval; and transmit an interference management signal to a base station serving the apparatus, the interference management signal indicating that the apparatus is initiating an interference management procedure based at least in part on the apparatus receiving the first signal from the victim UE.

A non-transitory computer readable medium for wireless communication is described. The non-transitory computer-readable medium may include instructions operable to cause a processor to listen, during a listening interval, for a first signal from a victim UE affected by communications to or from the first UE, the first signal indicative of interference at the victim UE; receive the first signal during the listening interval; and transmit an interference management signal to a base station serving the first UE, the interference management signal indicating that the first UE is initiating an interference management procedure based at least in part on the first UE receiving the first signal from the victim UE.

Some examples of the method, apparatus, and non-transitory computer-readable medium described above may further include processes, features, means, or instructions for receiving a registration request (RRQ) signal from the base station; and refraining from responding to the RRQ with uplink (UL) data or an RRS signal based at least in part on receiving the first signal. In some examples of the method, apparatus, and non-transitory computer-readable medium described above, the interference management procedure is an LBT procedure in a direction of the base station.

DETAILED DESCRIPTION

Figure 1:
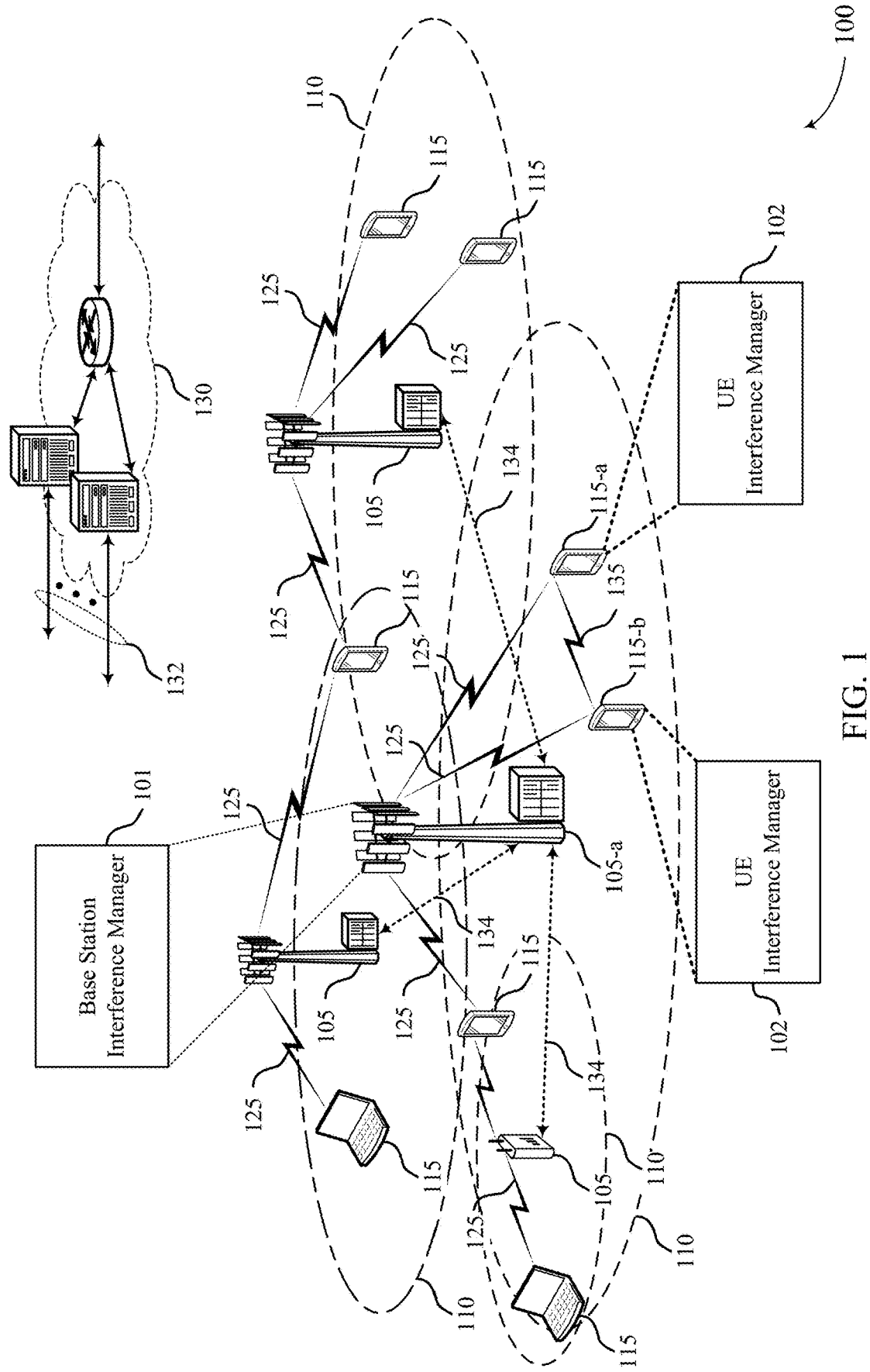
FIGS. 1 through 3 illustrate examples of a wireless communications system that supports interference management, in accordance with aspects of the present disclosure.

A base station may communicate with one or more user equipments (UEs) in a wireless system. The base station may be associated with a network operator. The base station may transmit a synchronization signal associated with a synchronization signal burst. In some cases, the base station may be a gNodeB (gNB) and transmit the synchronization signal burst in multiple directions (e.g., beamformed directions). That is, a synchronization signal burst may include a plurality of synchronization signals directed in different directions and transmitted during a set time interval. Alternatively, a base station may transmit a synchronization signal (or even some other type of signal) using an assigned channel or during an assigned transmission time, or both. In these cases, after transmission, the base station may listen for and receive a signal from a UE (e.g., a victim UE) using the assigned channel or during a listening interval associated with the assigned transmission time, or both. In some cases, a UE may identify that a synchronization signal (or other signal) transmitted by the base station is interfering with communications to or from the UE. The base station may listen for the UE signal (e.g., a complaint signal) during a listening interval.

In some cases, the victim UE may determine whether to send a complaint signal to the base station. For example, prior to transmitting the complaint signal to the base station, the UE may determine that a signal interference to noise ratio (SINR) value or a signal to noise ratio (SNR) value of a communication to or from the UE is satisfied, despite the interference caused by the synchronization signal. If the threshold is not satisfied, the UE may transmit a signal (e.g., a complaint signal) to the base station. In some cases, the signal transmitted by the UE to the base station may be a registration response (RRS) signal. Additionally, the UE may transmit the signal to the base station in a specific symbol of a frame, where the symbol may be associated with a direction of the synchronization signal received by the UE. In this case, the base station may listen for a signal from the UE in one or more symbols associated with the multiple directions of the synchronization signal burst. As such, the base station may receive the signal from the UE in a symbol that corresponds to one of the multiple directions.

A base station may then trigger an interference management procedure. The base station may, in some cases, initiate an interference management procedure based on receiving a signal from a UE indicating interference experienced at the UE. In some examples, an interference management procedure may be a listen-before-transmission (LBT) procedure. The LBT procedure may be in a direction of a UE based on a direction of the received signal from the UE. Additionally or alternatively, a base station may perform an interference management procedure in fewer than all directions of a transmitted synchronization signal burst. In this example, the base station may perform the interference management procedure in at least one of the multiple directions corresponding to a symbol in which the signal indicating interference at the UE is received. The interference management procedure may also be performed in a frequency, or timing associated with the received signal from the UE.

A UE may also experience an interference due to another UE. In this case, an interfering UE causing interference may listen for a signal from a victim UE affected by communications to or from the interfering UE. In some examples, the signal may indicate interference at the victim UE. In addition, the interfering UE may listen for the signal from the affected victim UE during a listening interval. The interfering UE may receive the signal during the listening interval. In some cases, the interfering UE may transmit an interference management signal to a serving base station. The interference management signal may indicate that the interfering UE is initiating an interference management procedure (e.g., LBT). Thus, the present disclosure provides techniques that support on-demand interference management. Triggering on-demand interference management in this way may reduce an overhead of the UE or base station by facilitating the performance of interference management procedures on an on-demand basis (instead of as a default option).

Aspects of the disclosure are initially described in the context of a wireless communications system. Exemplary UEs, base stations (e.g., evolved NodeBs (eNBs), gNBs), systems, and process flow that support on-demand interference management are then described. Aspects of the disclosure are further illustrated by and described with reference to apparatus diagrams, system diagrams, and flowcharts that relate to on-demand interference management.

FIG. 1 illustrates an example a wireless communications system 100 that supports interference management, in accordance with aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNBs.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service. The core network 130 may provide user authentication, access authorization, tracking, Internet Protocol (IP) connectivity, and other access, routing, or mobility functions.

One or more of the base stations 105 (e.g., base station 105-a) may include a base station interference manager 101, which may transmit a first signal; listen, after transmitting the first signal and during a listening interval, for a second signal from a UE 115-a affected by the first signal, the second signal being indicative of interference at the UE 115-a; receive the second signal during the listening interval; and initiate an interference management procedure based on the receipt of the second signal. In some cases, the first signal is a synchronization signal associated with a synchronization signal burst in multiple directions. A synchronization signal burst may include a plurality of synchronization signals directed in different directions during a set transmission period.

UE 115-a and UE 115-b may also include a UE interference manager 102, which may identify that a first signal from a base station 105-a is interfering with communications to or from the UE 115-a or UE 115-b, or both; and transmit a second signal to the base station 105-a during a listening interval in which the base station 105-a is listening for the second signal. The second signal may indicate interference at the UE 115-a or UE 115-b, or both.

For example, base station 105-a having a base station interference manager 101 may transmit a synchronization signal burst in multiple directions. Base station 105-a may also configure a listening interval to listen for one or more signals from UEs 115-a and 115-b, the signals indicating that the UEs 115-a or 115-b, or both are experiencing interference from one or more synchronization signals transmitted by the base station 105-a. The base station 105-a may receive the signal from UE 115-a or UE 115-b, or both, the UEs 115 being affected by the synchronization signal burst transmission during the listening interval. As a result, the base station 105-a may initiate an interference management procedure, e.g., LBT in a direction corresponding to, or on a frequency or time associated with the UE 115-a or the UE 115-b, or both.

Additionally or alternatively, UE interference manager 102 of UE 115-a may listen, during a listening interval, for a first signal from a UE 115 (e.g., UE 115-b) affected by communications to or from the listening UE 115-a, the first signal being indicative of interference at the victim UE 115-b; receive the first signal during the listening interval via communication link 135; and transmit an interference management signal to the base station 105-a serving the listening UE 115-a. In some cases, the interference management single may indicate that the UE 115-a is initiating an interference management procedure based on the UE 115-a receiving the first signal from the UE 115-b.

As an example, UE 115-a having a UE interference manager 102 may listen for a signal from UE 115-b indicating interference due to the listening UE 115-a. In this case, a victim UE 115-b (i.e., UE experiencing interference) may inform the interfering UE 115-a of the interference. The interfering UE 115-a may transmit an interference management signal to the base station 105-a serving the interfering UE 115-a indicating that the interfering UE 115-a is initiating an interference management procedure (e.g. LBT). Triggering on-demand interference management in this way may reduce an overhead and support enhanced coexistence, higher data rate, capacity, and spectral efficiency in wireless communications system 100.

In order to facilitate directional communications between the base stations 105 and the UEs 115, the wireless communications system 100 may use beams or beamformed signals for transmission and/or reception. A base station 105 may transmit beamformed signals on downlink (DL) beams associated with the base station 105. A UE 115 may receive a signal on one or more DL beams associated with the UE 115. The DL beam associated with the base station 105 and the DL beam associated with the UE 115 used for DL communication between the base station 105 and the UE 115 constitute a DL beam pair. Similarly, a UE 115 may transmit beamformed signals on uplink (UL) beams associated with the UE 115. A base station 105 may receive a signal on one or more UL beams associated with the base station 105. The UL beam associated with the UE 115 and the UL beam associated with the base station 105 used for UL communication between the UE 115 and the base station 105 constitute an UL beam pair. Wireless communications system 100 may support millimeter wave (mmW) communications between UEs 115 and base stations 105. Devices operating in mmW or extremely high frequency (EHF) bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals. In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARM) to provide retransmission at the MAC layer to improve link efficiency. In the control plane, the Radio Resource Control (RRC) protocol layer may provide establishment, configuration, and maintenance of an RRC connection between a UE 115 and a network device, such as a base station 105, or a core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers. In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
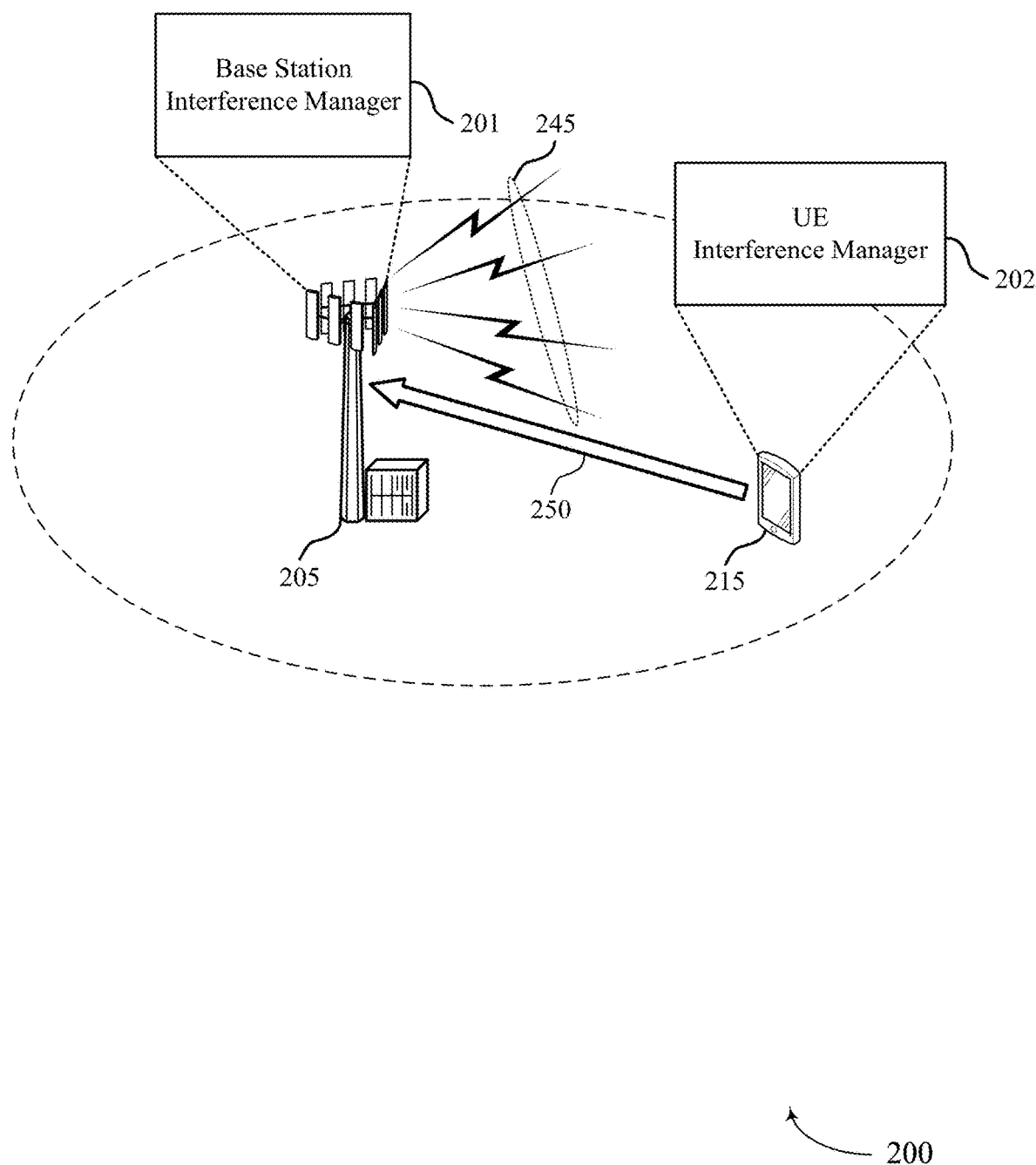

FIG. 2 illustrates an example of a wireless communications system 200 that supports interference management, in accordance with aspects of the present disclosure. In some examples, wireless communications system 200 may implement aspects of wireless communications system 100. In some examples, the wireless communications system 200 may implement an NR or other 5G cellular network. Wireless communications system 200 may include UE 215 and base station 205 which may be one or more aspects of UE 115 and base station 105 as described with reference to FIG. 1. In some cases, base station 205 may include base station interference manager 201 and UE 215 may include UE interference manager 202, which may be one or more aspects of base station interference manager 101 and UE interference manager 102 as described with reference to FIG. 1.

Base station 205 may establish a connection with UE 215. In some cases, base station 205 may be a serving cell for UE 215. In addition, base station 205 may be associated with a network operator. Base station 205 may be involved in communications that interfere with UE 215. For example, base station 205 may transmit communications 245 that may be received by UE 215. In response to determining that the base station 205 communications 245 may interfere with communications at UE 215, UE 215 may communicate with the base station 205 via communication 250. Base station 205 or UE 215, or both may support on-demand interference management.

Base station 205 may transmit a one or more signals or packets (e.g., data packet of management packet) in a direction of UE 215 via communications 245. In some cases, the one or more signals may be a synchronization signal. Additionally, the synchronization signal may be associated with a synchronization signal burst or set. That is, base station 205 may transmit multiple synchronization signals directed in different directions during a predetermined duration. Base station 205 may transmit a synchronization signal associated with a synchronization signal burst that may be received by UE 215. In some cases, base station 205 may be a mmW base station that may transmit a beamformed transmission on a mmW communication beam in a direction of UE 215. Thus, a transmission from base station 205 may be a beamformed or directional transmission directed towards UE 215. Base station 205 may transmit a synchronization signal of a synchronization signal burst in a direction of UE 215 using one or more mmW communication beams, e.g., communications 245. That is, base station 205 may transmit a synchronization signal burst in multiple directions (e.g., beamformed directions).

In some examples, base station 205 may, additionally or alternatively, transmit a signal (e.g., DL transmission) during different symbol periods of a frame or subframe. Base station 205 may configure or have a preconfigured frame structure, where the base station 205 transmits certain signals during a symbol, slot, or subframe, etc. The signals may be any type of signal, but in some instances may be a synchronization signal. As an example, base station 205 may have a number of synchronization signal bursts during a synchronization burst period. Different synchronization signal bursts within the synchronization burst period may use same or different amounts of resources of a frame. For example, some synchronization signal bursts of a set may use a same or different amount of bandwidth of an NR shared spectrum. The NR shared spectrum may utilize any combination of licensed, shared, and unlicensed spectrums, among others.

The number of synchronization bursts may be consecutive or nonconsecutive. For example, base station 205 may configure or be preconfigured to transmit one or more synchronization signals of the burst in the direction of UE 215 during one or more symbols of a subframe. For example, a base station may transmit a first synchronization signal during a first symbol period (e.g., symbol 0), a second synchronization signal during a second symbol period (e.g., symbol 1), etc. of a slot associated with a subframe. Base station 205 may, in some cases, transmit a signal (e.g., synchronization signal) in the direction of UE 215 using an assigned channel (e.g., 28 GHz, 40 GHz, 60 GHz) or during an assigned transmission time, or both.

Base station 205 may configure a listening interval. In some examples, the listening interval may be a sub-interval of a synchronization burst period. The listening interval may, additionally or alternatively, have an offset defining a time interval that is after the synchronization burst period. That is, a listening interval may occur a specified time after or immediately after a synchronization signal burst or before a next synchronization signal burst. For example, base station 205 may configure or have a preconfigured frame structure including 32 symbols to sweep multiple beam directions used to transmit multiple synchronization signals in a direction of UE 215, and other UEs (not shown) that may be within a serving cell of base station 205. In addition, the frame structure may include an additional 32 symbols that are associated with the listening interval. In some examples, base station 205 may compute a listening interval such that two or more synchronization signal bursts are back-to-back. In some cases, base station 205 may configure the listening interval to occur at an end of a synchronization signal burst set.

In some cases, base station 205 may listen for a signal from UE 215 during the listening interval. Base station 205 may listen for a signal from UE 215 in one or more symbols of a subframe associated with the multiple directions of the synchronization signal burst. For example, base station 205 may listen for a signal from UE 215 during a first symbol (e.g., symbol 0) of a slot or subframe that is associated with a first direction. The first symbol of a slot may correspond to a beam direction associated with transmissions in the direction of UE 215. In some cases, base station 205 may also listen for a signal from UE 215 during other symbol periods of a subframe.

UE 215 may monitor for interference arising from base station 205. For example, UE 215 may identify that a signal/burst or packet transmission from base station 205 is interfering with communications to or from the UE 215. In some cases, UE 215 may determine that an interference (e.g., signal or packet transmission) from base station 205 satisfies a threshold value based on the monitoring. Satisfying a threshold value may indicate that the interference is above a threshold value or at the threshold value. The threshold value may also be associated with an SINR value or an SNR of communications to or from UE 215. For example, a threshold value may be associated with an SINR falling below a threshold value relative to SNR. UE 215 may also determine an interference based on performing a radio resource monitoring (RRM) measurement of a received synchronization signal burst or set from base station 205. For example, UE 215 may determine from the synchronization signal burst or set which direction(s) are causing dominant interference, i.e., satisfy a threshold value. A synchronization signal burst may include a plurality of synchronization signals directed in different directions and transmitted by base station 205 during a set time interval. Additionally or alternatively, UE 215 may determine an interference from base station 205 based on an interference duty cycle (e.g., a function of both interference level and duty cycle).

UE 215 may initiate a mode to transmit a signal to an interfering base station (e.g., base station 205) via communication 250. In some cases, UE 215 may transmit a signal to base station 205 during a listening interval of base station 205 via communication 250. For example, UE 215 may retrieve a transmission schedule of the synchronization signal burst or set, or the listening interval, or both from base station 205. The signal may indicate to base station 205 that it is providing interference to communications to or from UE 215. For example, UE 215 may identify that an interference from base station 205 is exceeding a threshold value; as a result, UE 215 may transmit a signal to base station 205 indicating the interference. The signal transmitted from UE 215 to base station 205 indicating interference may also be an RRS signal. The RRS signal may include an interference power associated with an RRM measurement by the UE.

In some cases, when base station 205 transmits a registration request (RRQ) signal to schedule the UE 215, the UE 215 may include interference power as a measurement in an RRS signal to assist base station 205 in data rate control. Based on the measurement information included in the RRS signal, base station 205 may refrain from transmitting if base station 205 is in contention mode. As such, UE 215 may report a low interference level in the RRS signal. Alternatively, UE 215 may report a high interference level in the RRS signal if base station 205 was already in transmission mode.

UE 215 may also communicate with base station 205 using one or more mmW communication beams. As such, UE 215 may transmit a signal to base station 205 indicating interference using a mmW communication beam. In some cases, UE 215 may transmit a signal to base station 205 in a symbol associated with a direction of the signal (e.g., synchronization signal or packet transmission) received from base station 205. For example, base station 205 may have transmitted a synchronization signal in a direction of UE 215 during a first symbol (e.g., symbol 0) of a slot or subframe, that is associated with a first direction. UE 215 may identify the first symbol of the slot or subframe associated with the first direction, and transmit a signal, indicating interference, in a first symbol of a slot or subframe associated with UE 215.

Base station 205 may receive a signal on one or more UL beams associated with the base station 205. The UL beam associated with the UE 215 and the UL beam associated with the base station 205 used for UL communication between the UE 215 and the base station 205 constitute an UL beam pair. Thus, a first symbol of an UL beam of UE 215 may be associated with a same beamformed direction as a first symbol of an UL beam of base station 205. Additionally, UE 215 may receive a schedule associated with the synchronization signal burst or the listening interval, or both from base station 205. In this case, UE 215 may transmit a signal indicating interference to base station 205 that corresponds to a symbol in the listening interval where base station 205 will be listening based on the received schedule.

Base station 205 may initiate an interference management procedure based on receiving a signal (e.g., RRS signal) from UE 215, while listening during a listening interval. If base station 205 receives a signal from UE 215 during the listening interval, base station 205 may initiate an interference management procedure during a next transmission period associated with transmitting interference management signals in a direction of UE 215. In some cases, base station 205 may listen for a signal from UE 215 in one or more symbols associated with multiple directions of a synchronization signal burst transmission. As such, base station 205 may receive the signal from the UE 215 in a symbol that corresponds to one of the multiple directions. In some examples, base station 205 may perform an interference management procedure in fewer than all of the multiple directions of the synchronization signal burst, but at least in the one of the multiple directions corresponding to a symbol in which a signal was received from UE 215.

In some examples, an interference management procedure may be an LBT procedure. The LBT procedure may be in a direction of UE 215 based on a direction of the received signal from the UE 215. For example, base station 205 may have received a signal from UE 215 during a first symbol (e.g., symbol 0) of a slot or subframe, that is associated with a first direction. Base station 205 may identify the first symbol of the slot or subframe associated with the first direction, and transmit an interference management signal in a first symbol of a slot or subframe associated with base station 205 to UE 215. In some cases, the interference management procedure may also be performed in a direction, a frequency, or timing associated with the received signal from the UE 215.

Base station 205 may also update a transmission timer for an interference management procedure based on a receive time of a signal from UE 215 during a listening interval. For example, if base station 205 receives an RRS signal from UE 215 at a time that is above a threshold time associated with the transmission timer, base station 205 may initiate an interference management procedure, before transmitting an RRQ to UE 215. In some cases, base station 205 may update a transmission timer each time it receives a new signal (e.g., RRS signal) from UE 215. Alternatively, base station 205 may update a transmission timer based on a moving average of a number of received signals (e.g., RRS signals) during a period from UE 215. Thus, the present disclosure provides techniques that support on-demand interference management. Initiating an on-demand interference management may reduce an overhead of and support enhanced coexistence, higher data rate, capacity, and spectral efficiency in wireless communications system 200.

Figure 3:
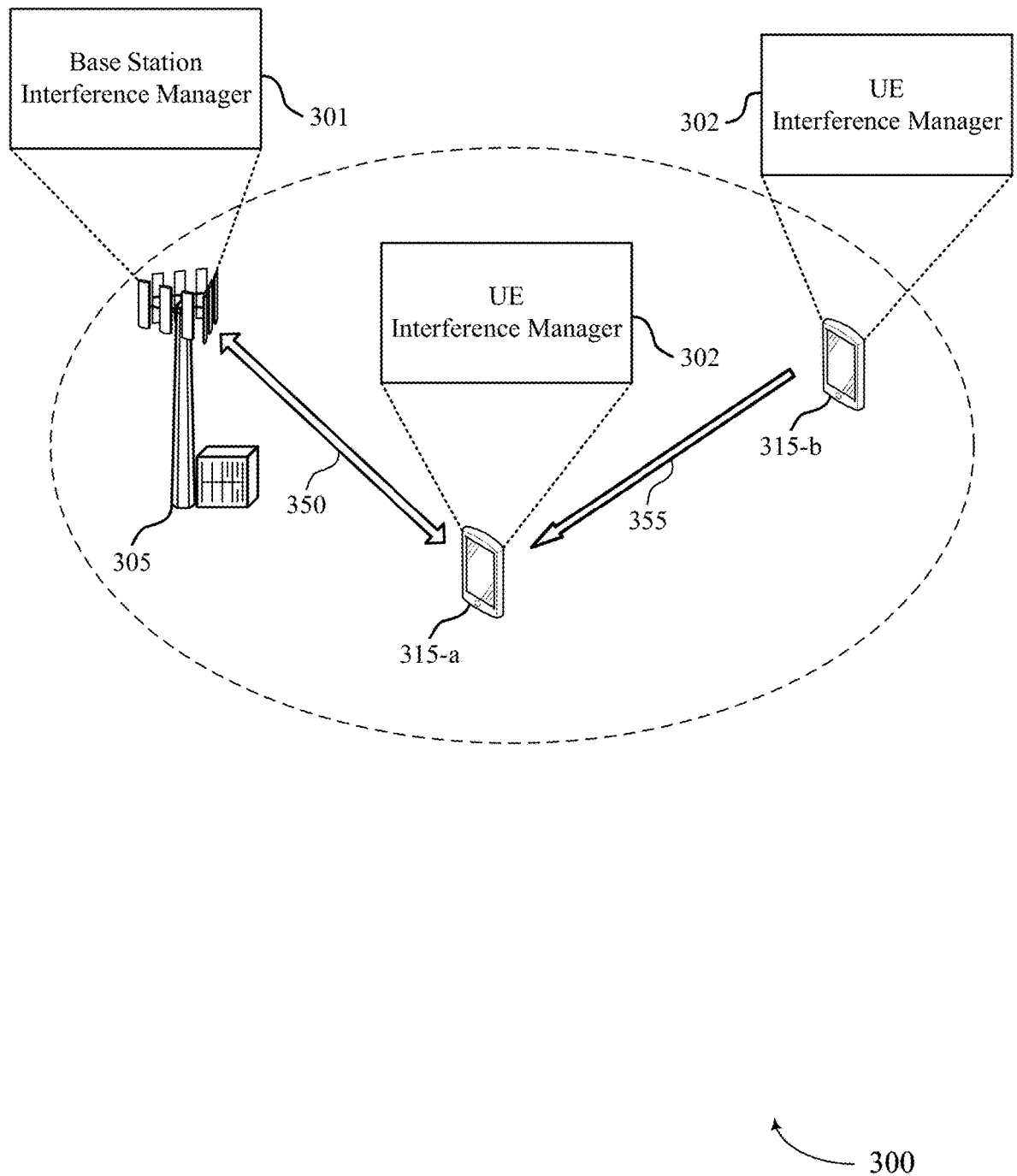

FIG. 3 illustrates an example of a wireless communications system 300 that supports interference management, in accordance with aspects of the present disclosure. In some examples, wireless communications system 300 may implement aspects of wireless communications system 100 or 200. In some examples, the wireless communications system 300 may implement an NR or other 5G cellular network. Wireless communications system 300 may include UE 315-*a*, UE 315-*b*, and base station 305 which may be one or more aspects of UE 115 or 215 and base station 105 or 205 as described with reference to FIG. 1 or 2. In some cases, base station 305 may include base station interference manager 301 and UEs 315-*a* and 315-*b* may include UE interference manager 302, which may be one or more aspects of base station interference manager 101 and UE interference manager 102 as described with reference to FIG. 1.

Base station 305 may communicate with UE 315-*a*. In some cases, base station 305 may be a serving cell for UE 315-*a* or UE 315-*b*, or both. In addition, base station 305 may be associated with a network operator. Base station 305 and UE 315-*a* may communicate with each other via communication link 350. For example, communication link 350 shown in wireless communications system 300 may include uplink transmissions from UE 315-*a* to base station 305, or downlink transmissions, from base station 305 in a direction of UE 315-*a*. Additionally, communications via communication link 350 may interfere with communications at UE 315-*b*. In some examples, UE 315-*a* and UE 315-*b* may be associated with a same or different network operator.

UE 315-*a* may communicate with UE 315-*b* via communication 355. For example, communication 3505 shown in wireless communications system 300 may include transmissions from UE 315-*b* to UE 315-*a*. In some cases, UE 315-*b* may be affected by communications to or from UE 315-*a*. In the context provided here, UE 315-*a* may be an interfering UE and UE 315-*b* may be a victim UE, i.e., a UE affected by communications to or from UE 315-*a*. Base station 305, UE 315-*a*, or UE 315-*b*, or a combination thereof may support on-demand interference management.

In some cases, base station 305 may be a mmW base station that may transmit a beamformed transmission on a mmW communication beam in a direction of UE 315-*a* or UE 315-*b*, or both. Thus, a transmission from base station 305 may be a beamformed or directional transmission directed towards UE 315-*a* or UE 315-*b*, or both. Similarly, UE 315-*a* or UE 315-*b*, or both may communicate with each other or base station 305 using a beamformed transmission on a mmW communication beam.

UE 315-*a* may listen for a signal from UE 315-*b*. The signal may indicate that UE 315-*b* is experiencing interference due to communications from or to UE 315-*a*. For example, the signal may be an RRS signal. In some cases, UE 315-*a* may listen for a signal from UE 315-*b* during a listening interval. The listening interval may be associated with a number of symbols, slots, or subframes, etc. In some examples, a listening interval may be based on a schedule (e.g., transmission schedule) received and assigned by base station 305. UE 315-*a* may receive the signal from UE 315-*b* based on listening during the listening interval.

UE 315-*a* may inform base station 305 of the received signal from UE 315-*b*. The UE 315-*a* may inform the base station 305 by transmitting an interference management signal to base station 305. The interference management signal may indicate that UE 315-*a* is initiating an interference management procedure, based on the received signal from UE 315-*b*. The interference management procedure may be an LBT procedure in a direction of base station 305. Base station 305 may receive the interference management signal from UE 315-*a* via communication link 350. The base station 305 may also initiate an interference management procedure with UE 315-*a* based on the received interference management signal. That is, base station 305 may perform an interference management procedure in a direction of UE 315-*a* based on a direction of the received interference management signal. For example, base station 305 may trigger an LBT mode when serving the UE 315-*a*.

In some cases, base station 305 may transmit an RRQ signal to UE 315-*a*. UE 315-*a* may receive the RRQ from base station 305. In some cases, UE 315-*a* may refrain from responding to the RRQ with UL data or an RRS signal based on receiving the signal from UE 315-*b*. For example, a UE network allocation vector (NAV) field may be set due to receiving an RRS signal from UE 315-*b*; as a result, UE 315-*a* may refrain from responding to an RRQ signal received from base station 305. In some cases, UE 315-*a* may enable or disable an interference management procedure mode (e.g., LBT mode) for base station 305 based on a number of signals (e.g., special RRS signals) received in a listening interval over a duration. Thus, base station 305, UE 315-*a*, or UE 315-*b*, or a combination thereof may support UE to UE on-demand interference management.

Figure 4:
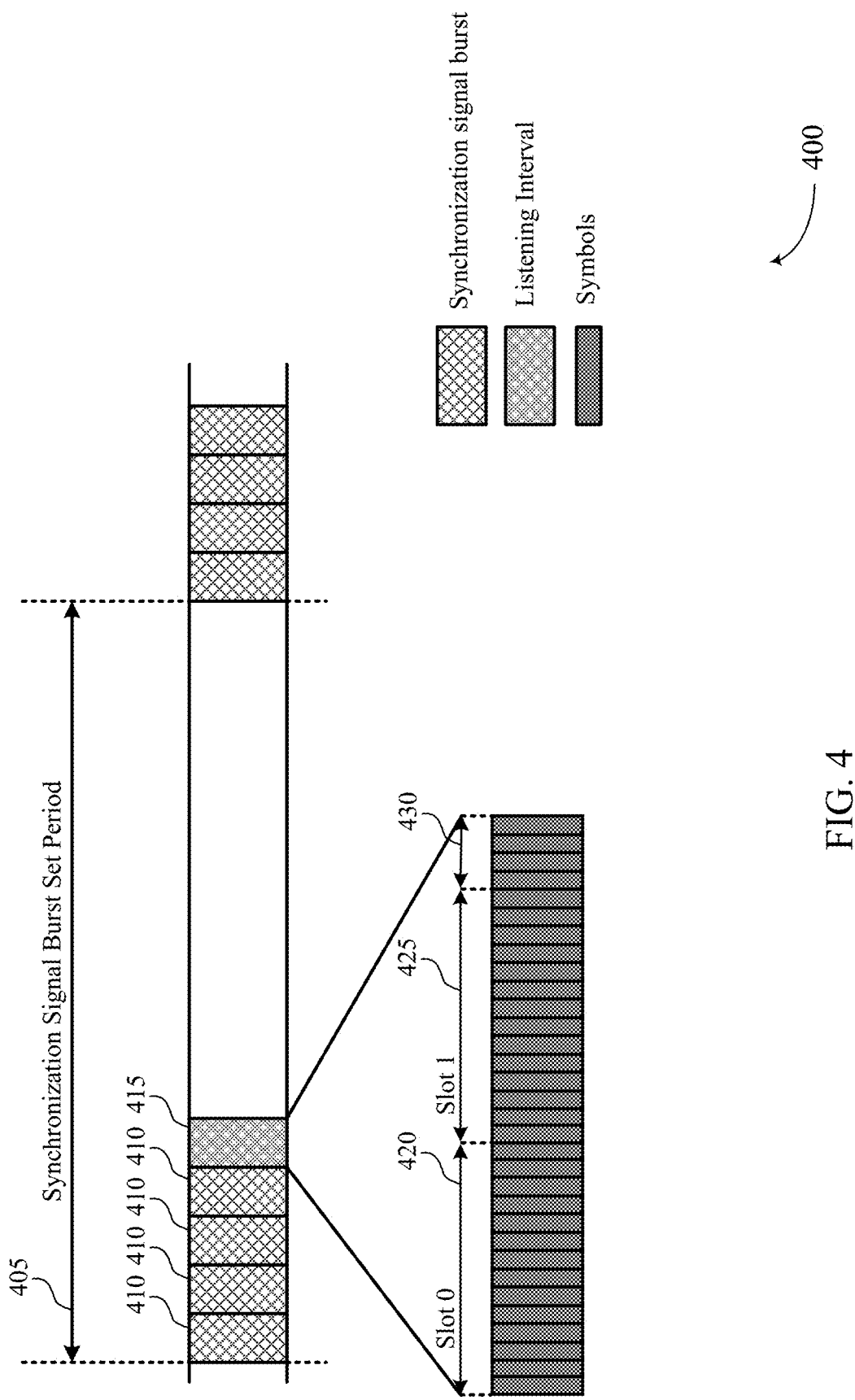
FIG. 4 illustrates an example of a frame structure that supports interference management in accordance with aspects of the present disclosure.

FIG. 4 illustrates an example of a frame structure 400 that supports interference management, in accordance with various aspects of the present disclosure. In some examples, frame structure 400 may implement aspects of wireless communications system 100 through 300. In some examples, frame structure 400 may be associated with a UE or base station as described with reference to FIGS. 1 through 3.

Frame structure 400 may include a synchronization signal burst set period 405. In some cases, a base station may transmit one or more synchronization signals to a UE during the synchronization signal burst set period 405. Each of synchronization signal of a plurality of synchronization signals of a synchronization signal burst may be directed in different directions and transmitted during a set duration. For example, a base station may transmit one or more synchronization signal bursts during one or more of synchronization signal burst blocks 410. Each of the synchronization signal burst blocks 410 may be associated with bandwidth and resources. For example, some synchronization signal burst blocks 410 may have a same or different amount of bandwidth of an NR shared spectrum. The NR shared spectrum may utilize any combination of licensed, shared, and unlicensed spectrums, among others. In addition, synchronization signal burst blocks 410 may have a duration associated with it. For example, each synchronization signal burst block 410 may have a length duration of 0.5 ms.

In some examples, frame structure 400 may include a listening interval 415. The listening interval 415 may include a first slot (i.e., slot 0) 420, a second slot (i.e., slot 1) 425, and a mini slot 430. Each of the slots 420, 425, or 430, or a combination thereof may include a number of symbols. For example, the first slot 420 and the second slot 425 may include 14 symbols. The symbols may be orthogonal frequency division multiplexing (OFDM) symbols. In some examples, each symbol associated with the listening interval 415 may be associated with a direction. For example, a first symbol (e.g., symbol 0) of the first slot 420 may be associated with a first direction, a second symbol (e.g., symbol 1) of the first slot 420 may be associated with a second direction, a third symbol (e.g., symbol 2) of the first slot 420 may be associated with a third direction, etc. Additionally, the direction associated with each symbol of the listening interval 415 may be associated with a transmit direction from a base station or a receive direction at the UE.

A UE may monitor for interference from a base station. For example, a UE may identify that a synchronization signal burst block 410 from a base station is interfering with communications to or from the UE. In some cases, a UE may determine that an interference from a base station satisfies a threshold value based on the monitoring. Satisfying a threshold value may indicate that the interference is above a threshold value or at the threshold value. The threshold value may also be associated with a SINR value or a SNR of the communications to or from a UE. For example, a threshold value may be associated with an SINR falling below a threshold value relative to SNR. A UE may also determine an interference based on performing an RRM measurement of a received synchronization signal burst block 410. For example, a UE may determine from the synchronization signal burst block 410 which direction(s) are causing dominant interference, i.e., satisfy a threshold value.

The UE may initiate a mode to transmit a signal to the interfering base station. In some cases, a UE may transmit a signal to the base station during the listening interval 415. The signal transmitted from a UE to a base station indicating interference may also be an RRS signal. The RRS signal may include an interference power associated with an RRM measurement by the UE. The UE may transmit the RRS signal to a base station in a symbol associated with a direction of a synchronization signal of a synchronization signal burst block received from a base station—that is, a symbol associated with a direction that the UE determined is causing dominant interference. For example, a base station may have transmitted a synchronization signal to a UE during a first symbol (e.g., symbol 0) of a slot or subframe, that is associated with a first direction. The UE may identify the first symbol of the slot or subframe associated with the first direction, and transmit a signal, indicating interference, in a first symbol of a slot or subframe during the listening interval 415. The base station may receive the RRS signal and initiate an interference management procedure (e.g., LBT) with the UE. Thus, frame structure 400 may support on-demand interference management.

Figure 5:
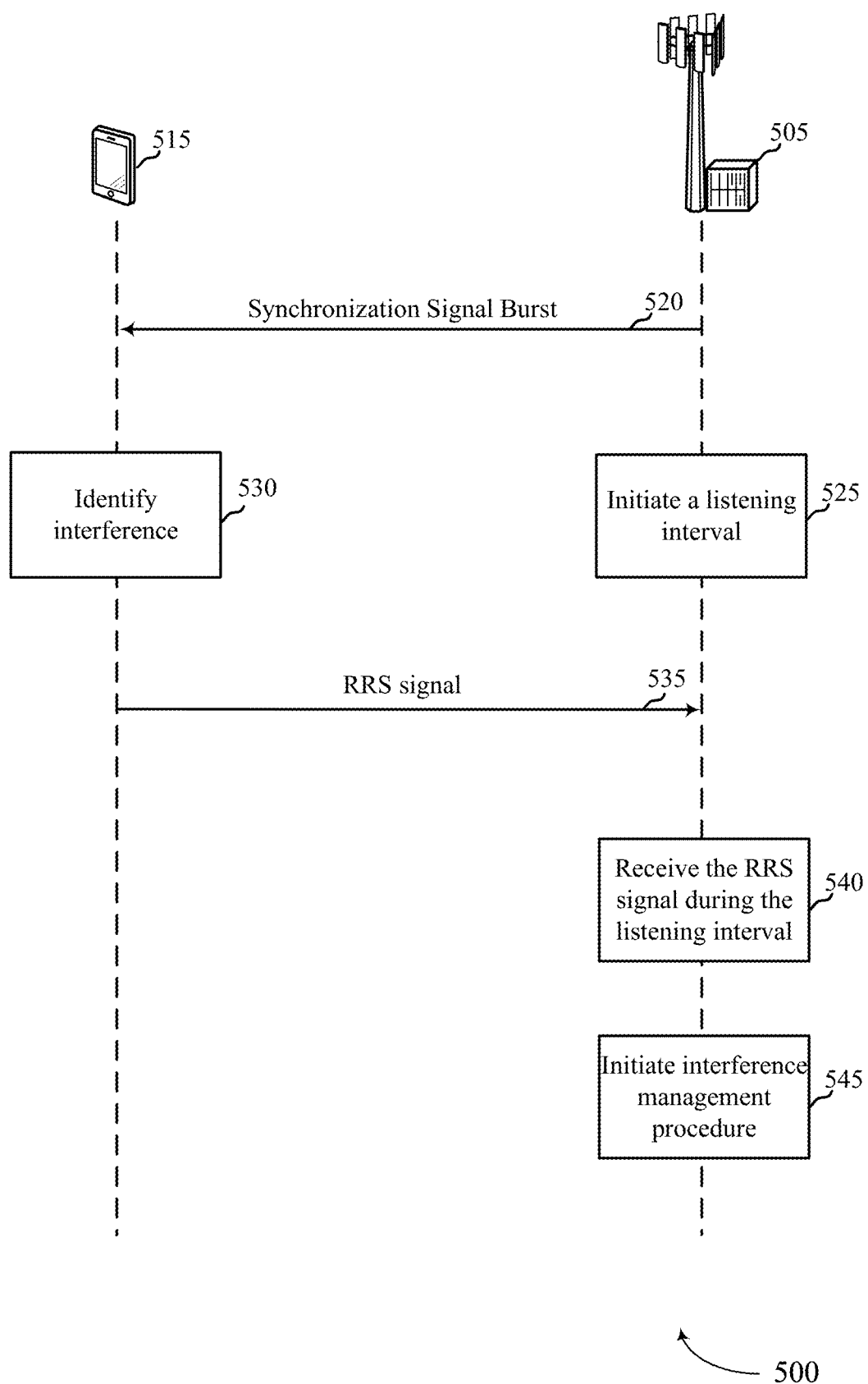
FIGS. 5 through 6 illustrate examples of a process flow that supports interference management, in accordance with aspects of the present disclosure.

FIG. 5 illustrates an example of a process flow 500 that supports interference management, in accordance with various aspects of the present disclosure. In some examples, process flow 500 may implement aspects of wireless communications system 100 through 300. Each of UE 515 or base station 505 may be an example of aspects of a respective one of the UEs or base stations described with reference to FIGS. 1 through 3. In some cases, base station 505 may be a gNB. Base station 505 or UE 515, or both may support on-demand interference management.

In the following description of the process flow 500, the operations between the UE 515 or base station 505 may be transmitted in a different order than the exemplary order shown, or the operations performed by UE 515 or base station 505 may be performed in different orders or at different times. Certain operations may also be left out of the process flow 500, or other operations may be added to the process flow 500.

At 520, base station 505 may transmit a synchronization signal burst in a direction of UE 515. In some cases, base station 505 may transmit a packet in a direction of UE 515 alternatively. The synchronization signal burst may be associated with a synchronization signal burst set. A synchronization signal burst set may include a plurality of synchronization signals directed in different directions and transmitted by base station 505 during a set duration That is, base station 505 may transmit multiple synchronization signals. In some cases, base station 505 may transmit a beamformed transmission on a mmW communication beam in a direction of UE 515. Thus, a transmission from base station 505 may be a beamformed or directional transmission directed towards UE 515. Base station 505 may transmit a synchronization signal burst in a direction of UE 515 using one or more mmW communication beams. That is, base station 505 may transmit a synchronization signal burst in multiple directions (e.g., beamformed directions).

Base station 505 may, additionally or alternatively, transmit a synchronization signal burst during different symbol periods of a frame or subframe. Base station 505 may configure or have a preconfigured frame structure, where the base station 505 transmits synchronization signals in a direction of UE 515 during different symbols of a slot. Base station 505 may have a number of synchronization signal bursts during a synchronization burst period. Different synchronization signal bursts within the synchronization burst period may use same or different amount of resources of a frame. For example, some synchronization signal bursts of a set may use a same or different amount of bandwidth.

At block 525, base station 505 may initiate a listening interval. In some examples, the listening interval may be a sub-interval of a synchronization burst period. The listening interval may, additionally or alternatively, have an offset. That is, a listening interval may occur a specific time after or immediately after a synchronization signal burst or before a next synchronization signal burst. For example, base station 505 may have a preconfigured frame structure including N number of symbols where N is an integer, to sweep multiple beam directions used to transmit multiple synchronization signals of a synchronization signal burst in a direction of UE 515. In addition, the frame structure may include additional N symbols that are associated with the listening interval. In some examples, base station 505 may compute a listening interval such that two or more synchronization signal bursts are back-to-back.

At block 530, UE 515 may identify interference. UE 515 may monitor an interference from base station 505 during a listening interval. For example, UE 515 may identify that a signal transmission from base station 505 is interfering with communications to or from the UE 515. In some cases, UE 515 may determine that an interference from base station 505 satisfies a threshold value based on the monitoring. Satisfying a threshold value may indicate that the interference is above a threshold value. The threshold value may also be associated with an SINR value or an SNR of the communications to or from UE 515. UE 515 may also determine an interference based on performing an RRM measurement of the received synchronization signal burst from base station 505. For example, UE 515 may determine from the synchronization signal burst which directions are causing dominant interference, i.e., satisfy a threshold value.

At 535, UE 515 may transmit an RRS signal to base station 505 during a listening interval of base station 505. The signal may indicate to base station 505 that it is providing interference to communications to or from UE 515. UE 515 may also communicate with base station 505 using one or more mmW communication beams. UE 515 may transmit the RRS signal to base station 505 indicating interference using a mmW communication beam. In some cases, UE 515 may transmit a signal to base station 505, in a symbol associated with a direction of the synchronization signal burst received from base station 505. For example, base station 505 may have transmitted the synchronization signal burst in a direction of UE 515 during a one or more symbols (e.g., symbols 0-4) of a slot or subframe, that is associated with directions directed towards UE 515. UE 515 may identify the one or more symbols of the slot or subframe associated with the directions, and transmit a RRS signal, indicating interference, in corresponding one or more symbols (e.g., symbols 0-4) of a slot or subframe associated with UE 515.

At block 540, base station 505 may receive the RRS signal during the listening interval. At block 545, base station 505 may initiate an interference management procedure. For example, base station 505 may initiate the interference management procedure based on receiving the RRS signal from UE 515, while listening during a listening interval. In some cases, base station 505 may listen for a RRS signal from UE 515 in one or more symbols associated with multiple directions of a synchronization signal burst transmission. As such, base station 505 may receive the RRS signal from the UE 515 in a symbol that corresponds to one of the multiple directions. In some examples, base station 505 may perform an interference management procedure in fewer than all of the multiple directions of the synchronization signal burst, but at least in the one of the multiple directions corresponding to a symbol in which a signal was received from UE 515.

Figure 6:
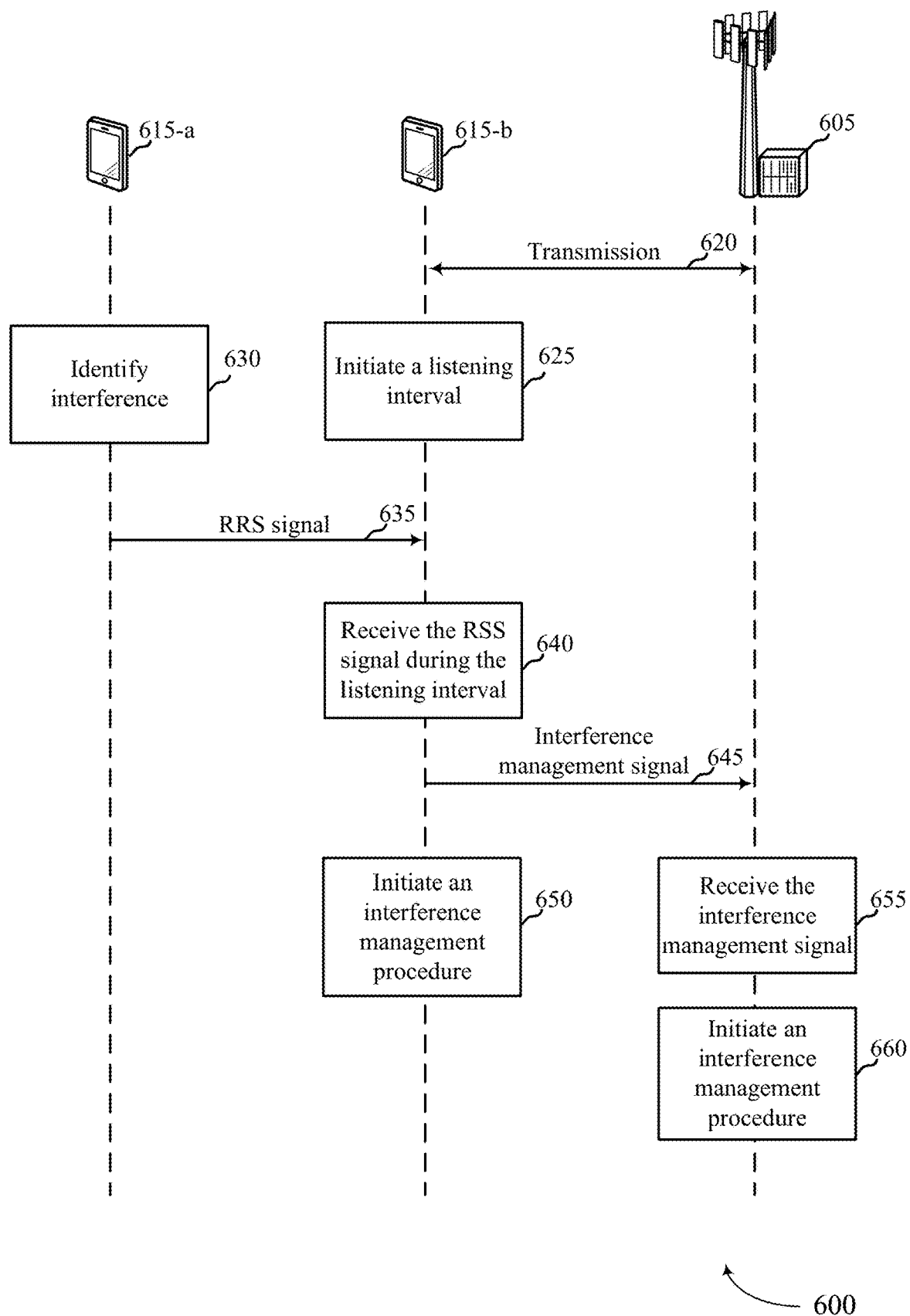

FIG. 6 illustrates an example of a process flow 600 that supports interference management, in accordance with various aspects of the present disclosure. In some examples, process flow 600 may implement aspects of wireless communications system 100 through 300. Each of UE 615-*a*, UE 615-*b*, or base station 605 may be an example of aspects of a respective one of the UEs or base stations described with reference to FIGS. 1 through 3. In some cases, base station 605 may be a gNB. Base station 605, UE 615-*a*, or UE 615-*b*, or a combination thereof may support on-demand interference management.

In the following description of the process flow 600, the operations between the UE 61 UE 615-*a*, UE 615-*b*, or base station 605 may be transmitted in a different order than the exemplary order shown, or the operations performed by UE 615-*a*, UE 615-*b*, or base station 605 may be performed in different orders or at different times. Certain operations may also be left out of the process flow 600, or other operations may be added to the process flow 600.

At 620, transmission between UE 615-*b* and base station 605 may be occurring. For example, UE 615-*b* may be transmitting UL data to base station 605, and base station 605 may receive the UL data from UE 615-*b*. Additionally or alternatively, base station 605 may be transmitting DL data to UE 615-*b*, and UE 615-*b* may receive the DL data from base station 605. In some cases, base station 605 or UE 615-*b*, or both may transmit a beamformed transmission on a mmW communication beam to base station 605 or UE 615-*b*. Thus, a transmission from base station 605 or UE 615-*b*, or both may be a beamformed or directional transmission directed towards base station 605 or UE 615-*b*. In some cases, base station 605 may transmit a transmission schedule to UE 615-*b*. At block 625, UE 615-*b* may initiate a listening interval. The listening interval may occur a time after or immediately after the transmission or before a next transmission to or from base station 605.

At block 630, UE 615-*a* may identify interference. UE 615-*a* may monitor an interference from UE 615-*b* during a listening interval. For example, UE 615-*b* may identify that a signal transmission from 615-*b* is interfering with communications to or from the UE 615-*a*. In some cases, UE 615-*a* may determine that an interference from 615-*b* satisfies a threshold value based on the monitoring. Satisfying a threshold value may indicate that the interference is above a threshold value. The threshold value may also be associated with a SINR value or a SNR of the communications to or from 615-*a*. In some cases, UE 615-*a* may also determine an interference based on performing an RRM measurement of the received transmissions from UE 615-*b*. For example, UE 615-*a* may determine from the received transmissions which directions are causing dominant interference, i.e., satisfy a threshold value.

At 635, UE 615-*a* may transmit an RRS signal to UE 615-*b*. The signal may indicate to UE 615-*b* that it is providing interference to communications to or from UE 615-*a*. UE 615-*a* may also communicate with UE 615-*b* using one or more mmW communication beams. UE 615-*b* may transmit the RRS signal to UE 615-*a* indicating interference using a mmW communication beam. At block 640, UE 615-*b* may receive the RSS signal during the listening interval. At 645, UE 615-*b* may transmit an interference management signal to base station 605. The interference management signal may indicate to base station 605 that UE 615-*b* is initiating an interference management procedure (e.g., LBT) in response to receiving the RRS signal from UE 615-*a*.

At block 650, UE 615-*b* may initiate an interference management procedure. The interference management procedure may be an LBT procedure in a direction of base station 605. At block 655, base station 605 may receive the interference management signal 645 from UE 615-*b*. At block 660, base station may initiate an interference management procedure. That is, the base station 605 may also initiate an interference management procedure with UE 615-*b* based on the received interference management signal. Thus, base station 605 may perform an interference management procedure in a direction of UE 615-*b* based on a direction of the received interference management signal. For example, base station 605 may trigger an LBT mode when serving the UE 615-*b*. thus, base station 605, UE 615-*a*, or UE 615-*b*, or a combination thereof may support UE to UE on-demand interference management.

Figure 7:
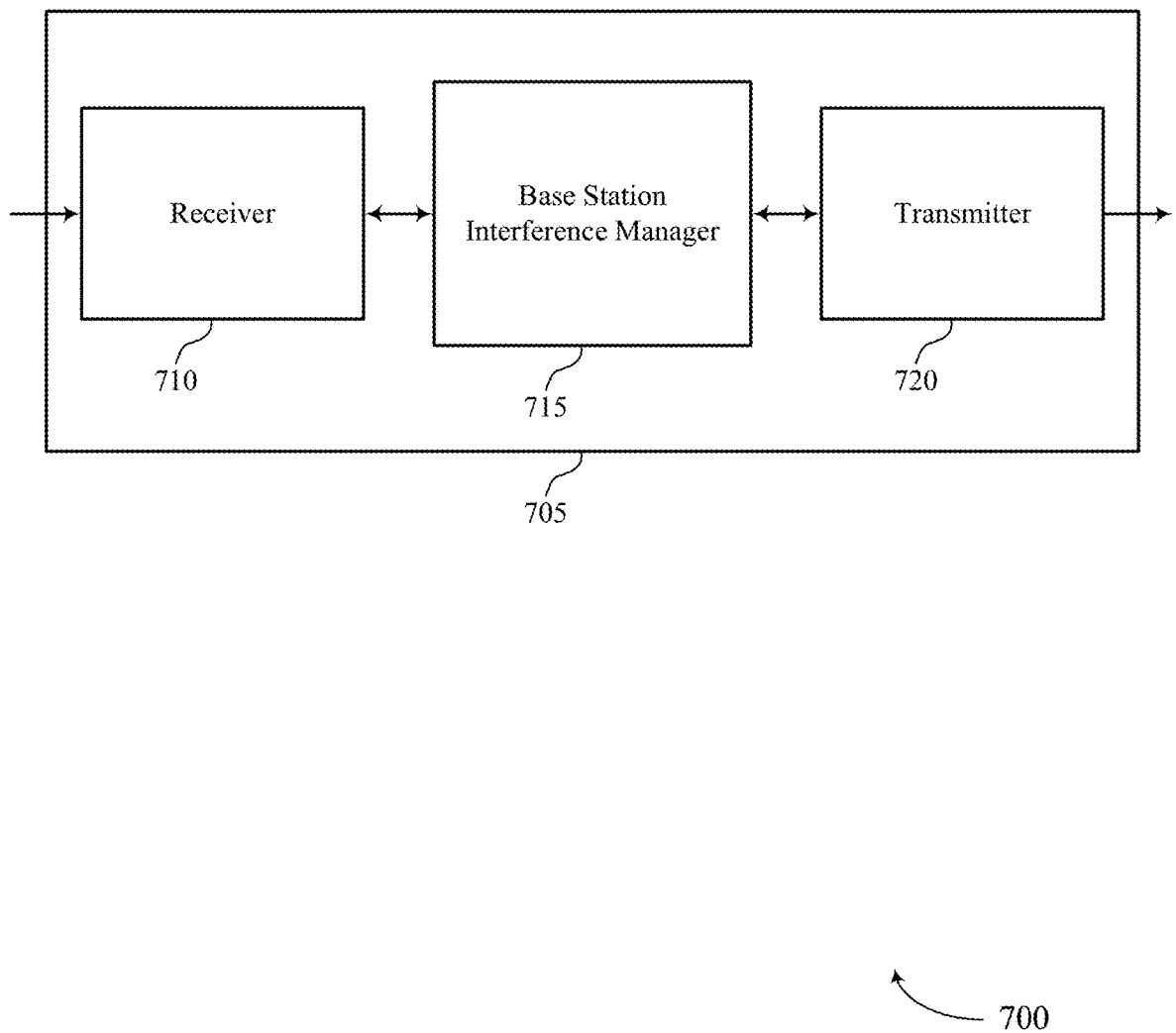
FIGS. 7 through 9 show block diagrams of a device that supports interference management, in accordance with aspects of the present disclosure.

FIG. 7 shows a block diagram 700 of a wireless device 705 that supports interference management, in accordance with aspects of the present disclosure. Wireless device 705 may be an example of aspects of a base station 105 as described herein. Wireless device 705 may include receiver 710, base station interference manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to on-demand interference management, etc.). Information may be passed on to other components of the device. The receiver 710 may be an example of aspects of the transceiver 1035 described with reference to FIG. 10. The receiver 710 may utilize a single antenna or a set of antennas.

Base station interference manager 715 and/or at least some of its various sub-components may be implemented in hardware, software executed by a processor, firmware, or any combination thereof. If implemented in software executed by a processor, the functions of the base station interference manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station interference manager 715 and/or at least some of its various sub-components may be physically located at various positions, including being distributed such that portions of functions are implemented at different physical locations by one or more physical devices. In some examples, base station interference manager 715 and/or at least some of its various sub-components may be a separate and distinct component in accordance with various aspects of the present disclosure. In other examples, base station interference manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station interference manager 715 may listen, after transmitting a first signal and during a listening interval, for a second signal from a first UE affected by the first signal, the second signal being indicative of interference at the first UE, receive the second signal during the listening interval, and initiate an interference management procedure based on receipt of the second signal.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas. Transmitter 720 may transmit the first signal. In some cases, the first signal is a synchronization signal associated with a synchronization signal burst in multiple directions. In some cases, a synchronization signal burst may include a plurality of synchronization signals directed in different directions and transmitted during a set duration. In some cases, the first signal is a synchronization signal transmitted using an assigned channel or during an assigned transmission time, or both. In some cases, the first signal is a packet transmission, and where the listening interval is immediately after a transmission time interval of the first signal.

Figure 8:
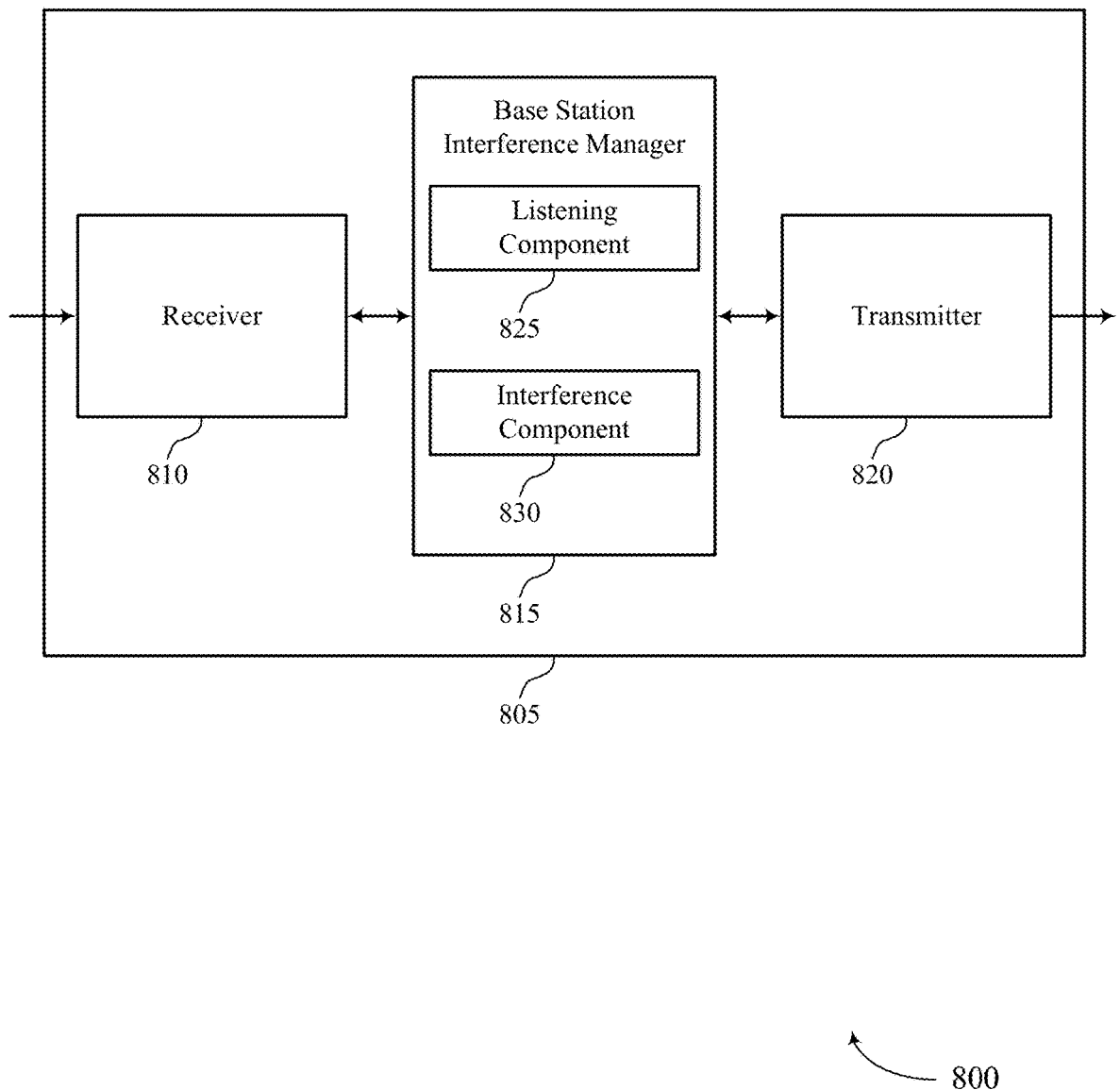

FIG. 8 shows a block diagram 800 of a wireless device 805 that supports interference management in accordance with aspects of the present disclosure. Wireless device 805 may be an example of aspects of a wireless device 705 or a base station 105 as described with reference to FIG. 7. Wireless device 805 may include receiver 810, base station interference manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to on-demand interference management, etc.). Information may be passed on to other components of the device. The receiver 810 may be an example of aspects of the transceiver 1035 described with reference to FIG. 10. The receiver 810 may utilize a single antenna or a set of antennas.

Base station interference manager 815 may be an example of aspects of the base station interference manager 715 described with reference to FIG. 7. Base station interference manager 815 may also include listening component 825 and interference component 830. Listening component 825 may listen, after transmitting the first signal and during a listening interval, for a second signal from a first UE affected by the first signal, the second signal being indicative of interference at the first UE, receive the second signal during the listening interval. Listening component 825 may listen for the second signal in one or more symbols associated with the multiple directions of the synchronization signal burst. In some cases, Listening component 825 may receive the second signal in a symbol that corresponds to one of the multiple directions of the synchronization signal burst, and listen for the second signal using the assigned channel or during the listening interval which is associated with the assigned transmission time, or both.

Interference component 830 may perform the interference management procedure in fewer than all of the multiple directions of the synchronization signal burst, but at least in the one of the multiple directions corresponding to the symbol in which the second signal was received. Interference component 830 may initiate an interference management procedure based on receipt of the second signal. In some cases, interference component 830 may receive an interference management signal from a second UE served by the base station indicating that the second UE is initiating an additional interference management procedure based on the second UE receiving an additional signal from an additional UE. The additional signal may be indicative of interference at the additional UE. Interference component 830 may participate in the additional interference management procedure with the second UE based on the received interference management signal, and perform a LBT procedure in a direction of the second UE based on a direction of the received interference management signal. In some cases, the interference management procedure includes the LBT procedure in a direction of the first UE based on a direction of the received second signal. In some cases, the interference management procedure is performed in a direction, a frequency, or timing associated with the received second signal of the first UE.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
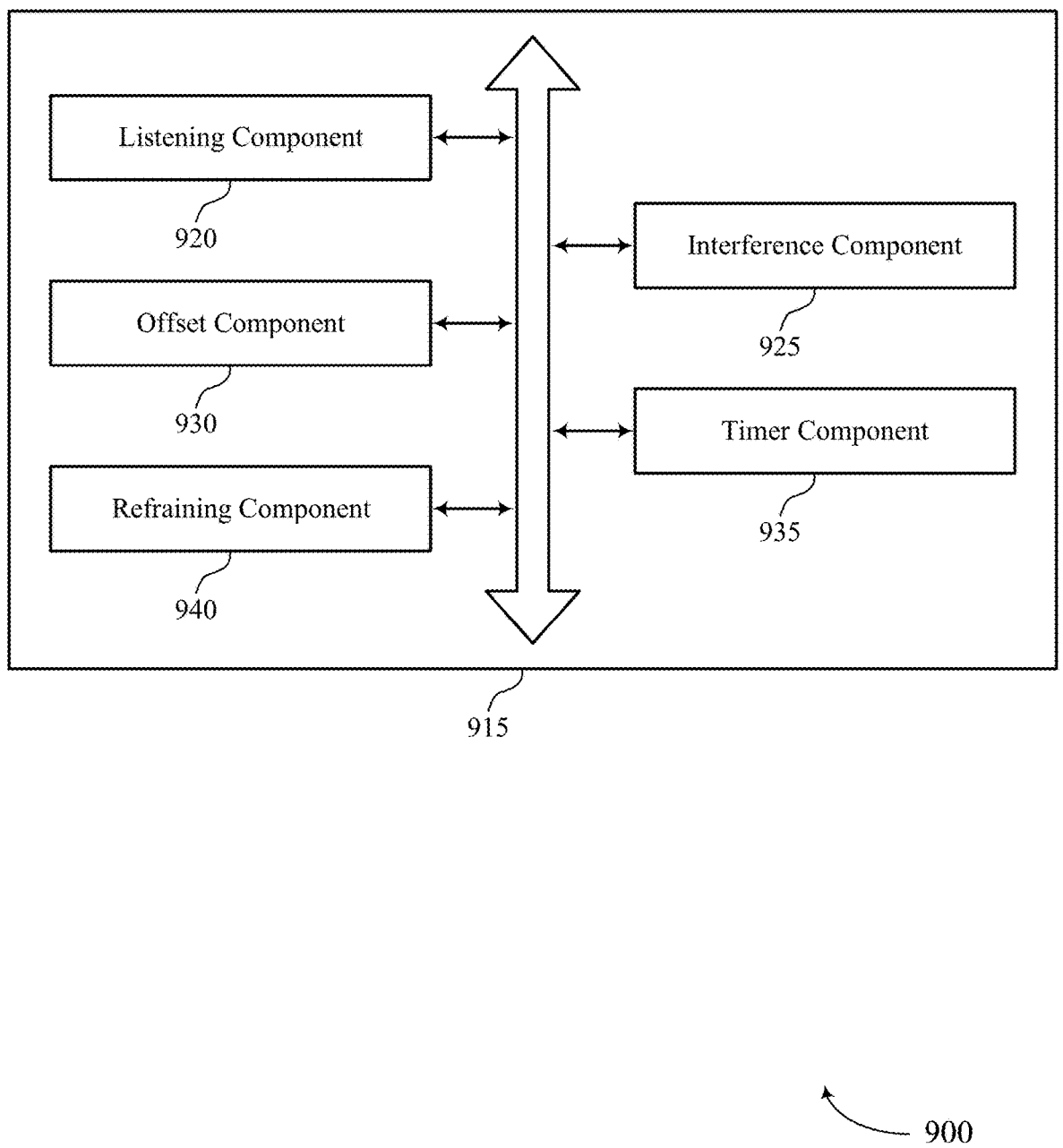

FIG. 9 shows a block diagram 900 of a base station interference manager 915 that supports interference management in accordance with aspects of the present disclosure. The base station interference manager 915 may be an example of aspects of a base station interference manager 715, a base station interference manager 815, or a base station interference manager 1015 described with reference to FIGS. 7, 8, and 10. The base station interference manager 915 may include listening component 920, interference component 925, offset component 930, timer component 935, and refraining component 940. Each of these modules may communicate, directly or indirectly, with one another (e.g., via one or more buses).

Listening component 920 may listen, after transmitting the first signal and during a listening interval, for a second signal from a first UE affected by the first signal, the second signal being indicative of interference at the first UE. In some cases, listening component 920 may receive the second signal during the listening interval. Listening component 920 may listen for the second signal in one or more symbols associated with the multiple directions of the synchronization signal burst, receive the second signal in a symbol that corresponds to one of the multiple directions of the synchronization signal burst. In some examples, listening component 920 may listen for the second signal using the assigned channel or during the listening interval which is associated with the assigned transmission time, or both.

Interference component 925 may perform the interference management procedure in fewer than all of the multiple directions of the synchronization signal burst, but at least in the one of the multiple directions corresponding to the symbol in which the second signal was received. Interference component 925 may initiate an interference management procedure based on receipt of the second signal. Interference component 925 may receive an interference management signal from a second UE served by the base station indicating that the second UE is initiating an additional interference management procedure based on the second UE receiving an additional signal from an additional UE, the additional signal indicative of interference at the additional UE. Interference component 925 may participate in the additional interference management procedure with the second UE based on the received interference management signal, and perform a LBT procedure in a direction of the second UE based on a direction of the received interference management signal. In some cases, the interference management procedure includes a LBT procedure in a direction of the first UE based on a direction of the received second signal. In some cases, the interference management procedure is performed in a direction, a frequency, or timing associated with the received second signal of the first UE.

Offset component 930 may determine an offset between the listening interval and the synchronization signal burst. Timer component 935 may update a transmission timer for the interference management procedure based on a receive time of the second signal during the listening interval. Refraining component 940 may refrain from transmitting to the first UE when the base station is in a contention mode based on receiving the second signal.

Figure 10:
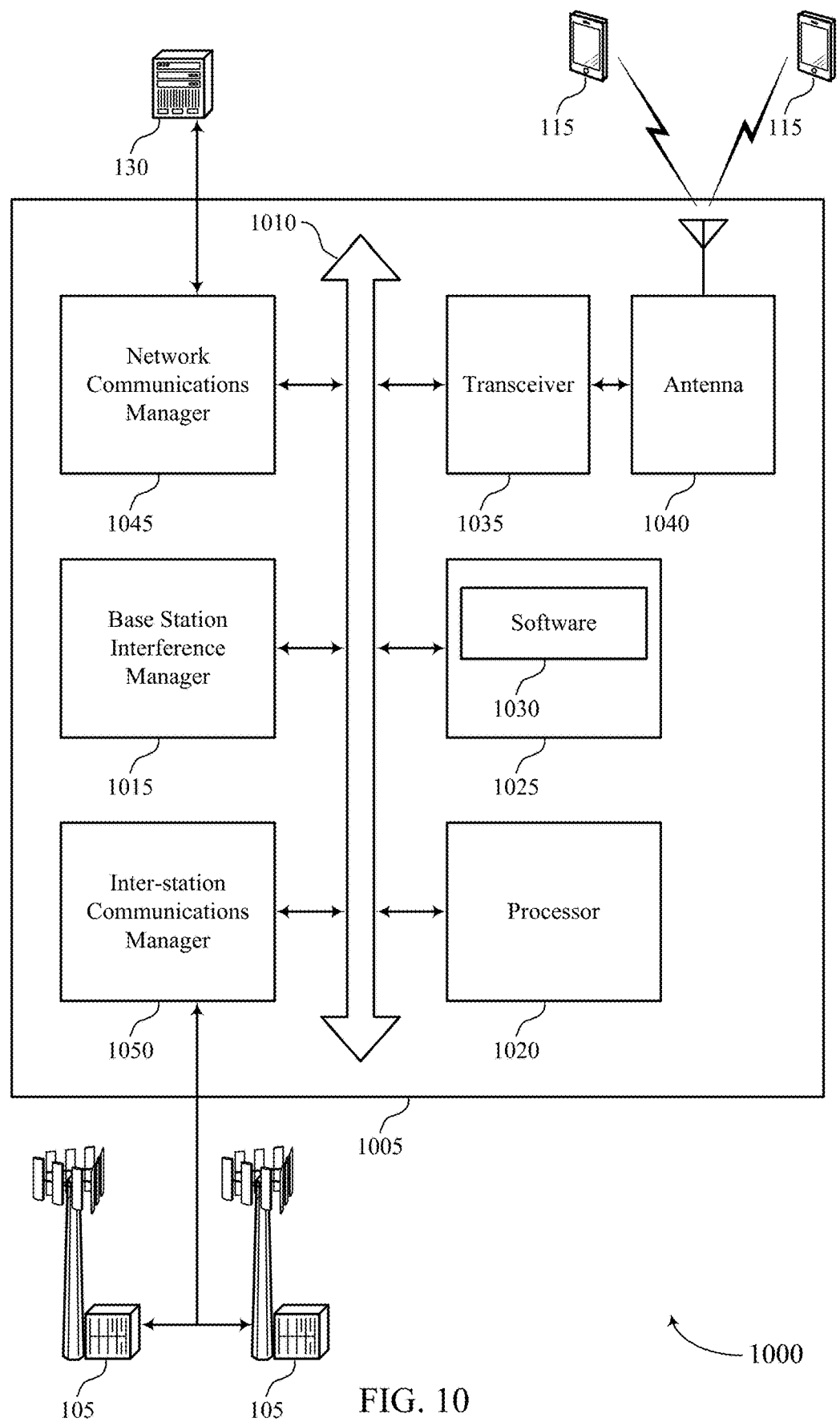
FIG. 10 illustrates a block diagram of a system including a base station that supports interference management, in accordance with aspects of the present disclosure.

FIG. 10 shows a diagram of a system 1000 including a device 1005 that supports interference management in accordance with aspects of the present disclosure. Device 1005 may be an example of or include the components of wireless device 705, wireless device 805, or a base station 105 as described above, e.g., with reference to FIGS. 7 and 8. Device 1005 may include components for bi-directional voice and data communications including components for transmitting and receiving communications, including base station interference manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting on-demand interference management).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices. Software 1030 may include code to implement aspects of the present disclosure, including code to support on-demand interference management. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115. Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an Long Term Evolution (LTE)/LTE-A wireless communication network technology to provide communication between base stations 105.

Figure 11:
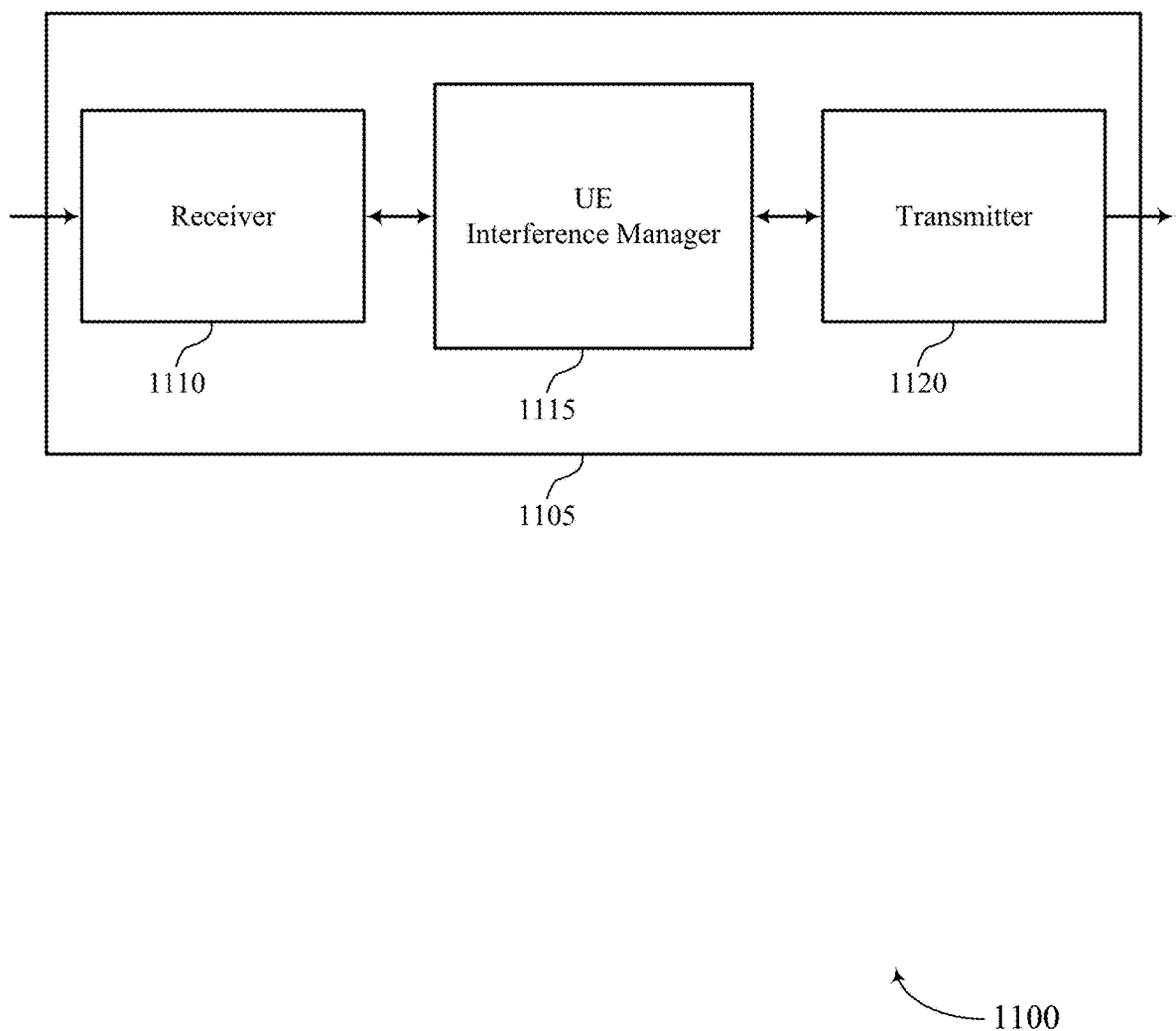
FIGS. 11 through 13 show block diagrams of a device that supports interference management, in accordance with aspects of the present disclosure.

FIG. 11 shows a block diagram 1100 of a wireless device 1105 that supports interference management in accordance with aspects of the present disclosure. Wireless device 1105 may be an example of aspects of a UE 115 as described herein. Wireless device 1105 may include receiver 1110, UE interference manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to on-demand interference management, etc.). Information may be passed on to other components of the device. The receiver 1110 may be an example of aspects of the transceiver 1435 described with reference to FIG. 14. The receiver 1110 may utilize a single antenna or a set of antennas.

UE interference manager 1115 and/or at least some of its various sub-components may be implemented in hardware, software executed by a processor, firmware, or any combination thereof. If implemented in software executed by a processor, the functions of the UE interference manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE interference manager 1115 and/or at least some of its various sub-components may be physically located at various positions, including being distributed such that portions of functions are implemented at different physical locations by one or more physical devices. In some examples, UE interference manager 1115 and/or at least some of its various sub-components may be a separate and distinct component in accordance with various aspects of the present disclosure. In other examples, UE interference manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE interference manager 1115 may identify that a first signal from a base station is interfering with communications to or from the wireless device 1105 and transmit a second signal to the base station during a listening interval in which the base station is listening for the second signal, the second signal indicative of interference at the wireless device 1105. The UE interference manager 1115 may also listen, during a listening interval, for a first signal from a victim UE affected by communications to or from the wireless device 1105, the first signal indicative of interference at the victim UE, receive the first signal during the listening interval, and transmit an interference management signal to a base station serving the wireless device 1105, the interference management signal indicating that the wireless device 1105 is initiating an interference management procedure based on the wireless device 1105 receiving the first signal from the victim UE.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
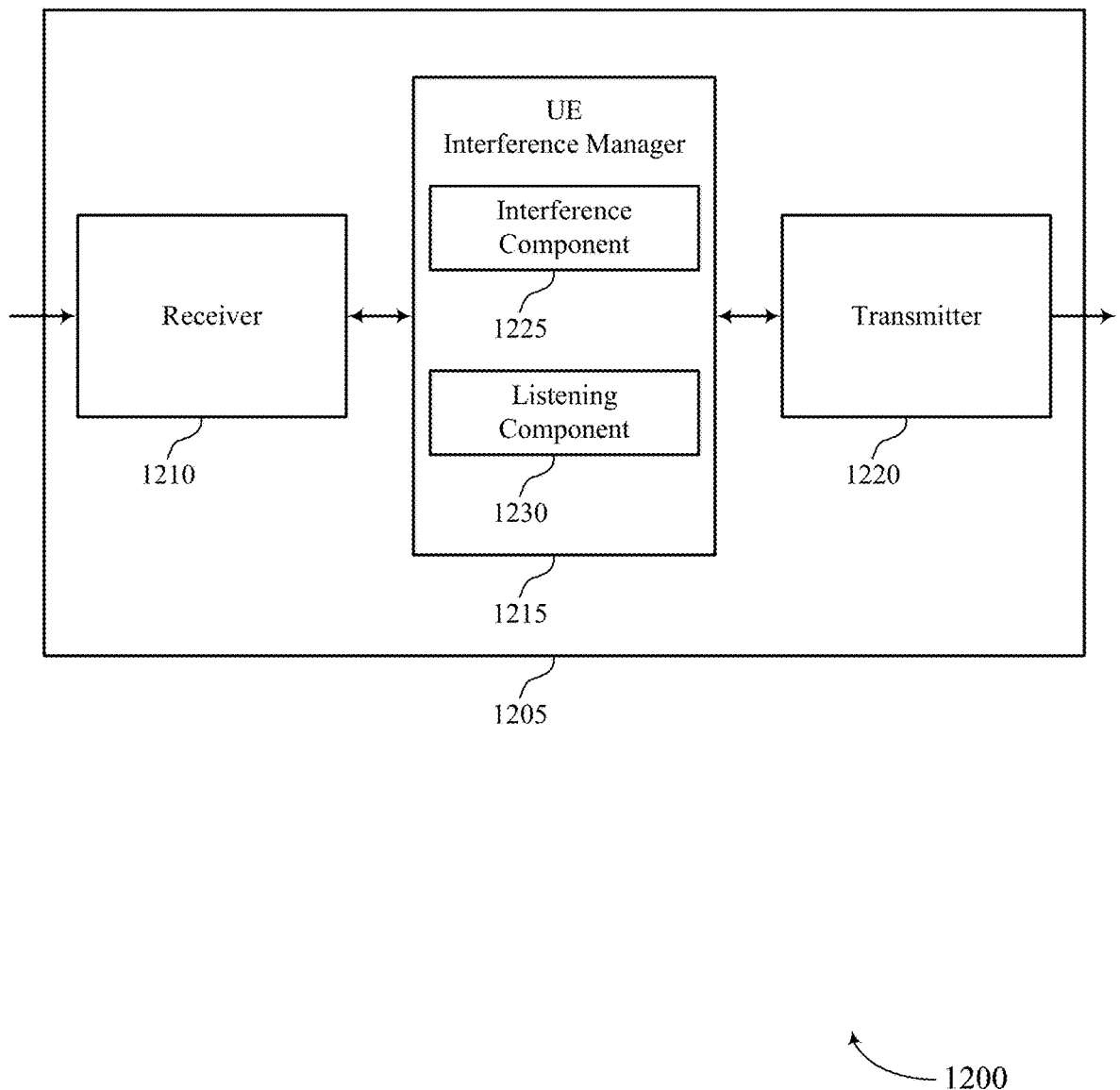

FIG. 12 shows a block diagram 1200 of a wireless device 1205 that supports interference management in accordance with aspects of the present disclosure. Wireless device 1205 may be an example of aspects of a wireless device 1105 or a UE 115 as described with reference to FIG. 11. Wireless device 1205 may include receiver 1210, UE interference manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to on-demand interference management, etc.). Information may be passed on to other components of the device. The receiver 1210 may be an example of aspects of the transceiver 1435 described with reference to FIG. 14. The receiver 1210 may utilize a single antenna or a set of antennas.

UE interference manager 1215 may be an example of aspects of the UE interference manager 1115 described with reference to FIG. 11. UE interference manager 1215 may also include interference component 1225 and listening component 1230. Interference component 1225 may identify that a first signal from a base station is interfering with communications to or from the wireless device 1205 and transmit a second signal to the base station indicating that the base station is interfering with the wireless device 1205. In some cases, the first signal is associated with a synchronization signal burst. In some cases, the identifying that the first signal from the base station is interfering with communications to or from the victim UE is based on performing an RRM measurement of the synchronization signal burst. In some cases, the interference management procedure is an LBT procedure in a direction of the base station. In other instances where the wireless device 1205 receives a first signal such as an interference complaint signal from a different, victim UE, the wireless device 1205 may transmit an interference management signal to a base station serving the wireless device 1205, the interference management signal indicating that the wireless device 1205 is initiating an interference management procedure based on the wireless device 1205 receiving the first signal from the victim UE.

Listening component 1230 may listen, during a listening interval, for a first signal from a victim UE affected by communications to or from the wireless device 1205, the first signal indicative of interference at the victim UE, and receive the first signal during the listening interval.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
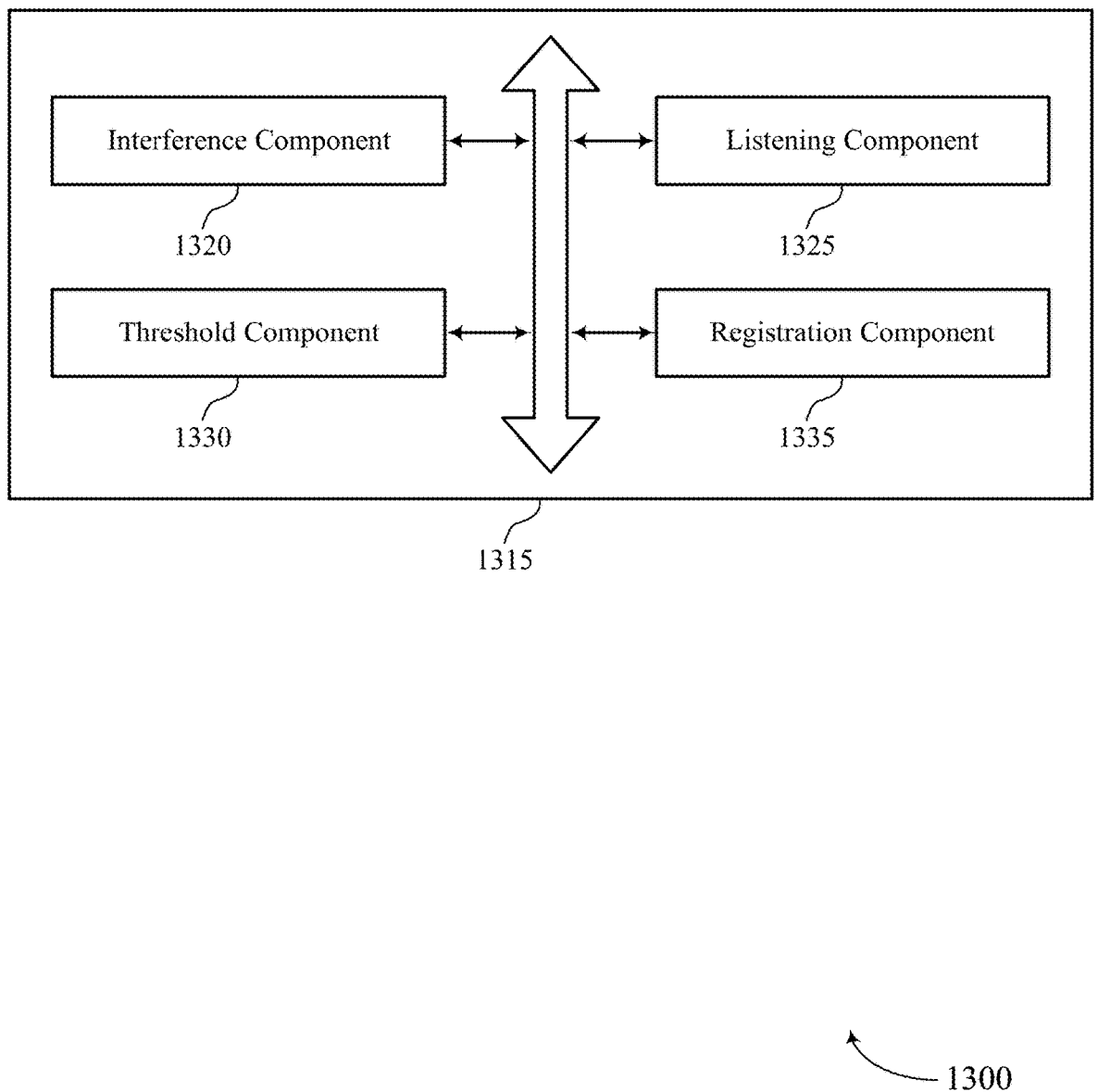

FIG. 13 shows a block diagram 1300 of a UE interference manager 1315 that supports interference management in accordance with aspects of the present disclosure. The UE interference manager 1315 may be an example of aspects of a UE interference manager 1415 described with reference to FIGS. 11, 12, and 14. The UE interference manager 1315 may include interference component 1320, listening component 1325, threshold component 1330, and registration component 1335. Each of these modules may communicate, directly or indirectly, with one another (e.g., via one or more buses).

Interference component 1320 may identify that a first signal from a base station is interfering with communications to or from the UE and transmit a second signal to the base station indicating that the base station is interfering with the UE. In some cases, the first signal is associated with a synchronization signal burst. In some cases, the identifying that the first signal from the base station is interfering with communications to or from the victim UE is based on performing an RRM measurement of the synchronization signal burst. In some cases, the interference management procedure is a LBT procedure in a direction of the base station. In other instances where the UE receives a first signal such as an interference complaint signal from a different, victim UE, the UE may transmit an interference management signal to a base station serving the UE, the interference management signal indicating that the UE is initiating an interference management procedure based on the UE receiving the first signal from the victim UE.

Listening component 1325 may listen, during a listening interval, for a first signal from a victim UE affected by communications to or from the UE, the first signal indicative of interference at the victim UE, and receive the first signal during the listening interval.

Threshold component 1330 may determine that the first signal or the communications to or from the victim UE satisfy a threshold value. In some cases, the threshold value is associated with an SINR value or an SNR of the communications to or from the victim UE. In some cases, the transmitting the second signal to the base station is based on the first signal satisfying the threshold value. Registration component 1335 may receive an RRQ from the base station and refrain from responding to the RRQ with UL data or an RRS signal based on receiving the first signal.

Figure 14:
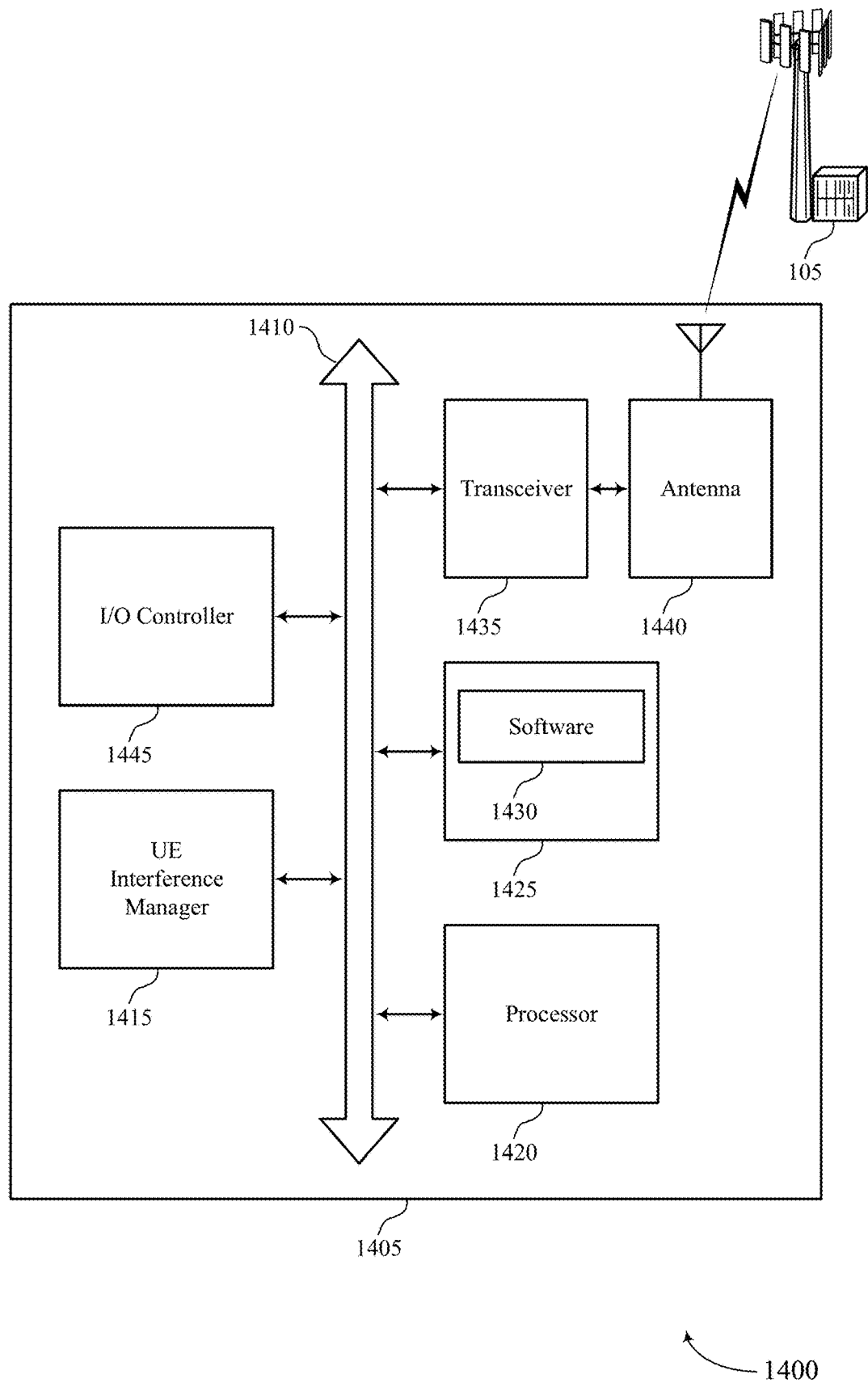
FIG. 14 illustrates a block diagram of a system including a user equipment (UE) that supports interference management, in accordance with aspects of the present disclosure.

FIG. 14 shows a diagram of a system 1400 including a device 1405 that supports interference management in accordance with aspects of the present disclosure. Device 1405 may be an example of or include the components of UE 115 as described above, e.g., with reference to FIG. 1. Device 1405 may include components for bi-directional voice and data communications including components for transmitting and receiving communications, including UE interference manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting on-demand interference management).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support on-demand interference management. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
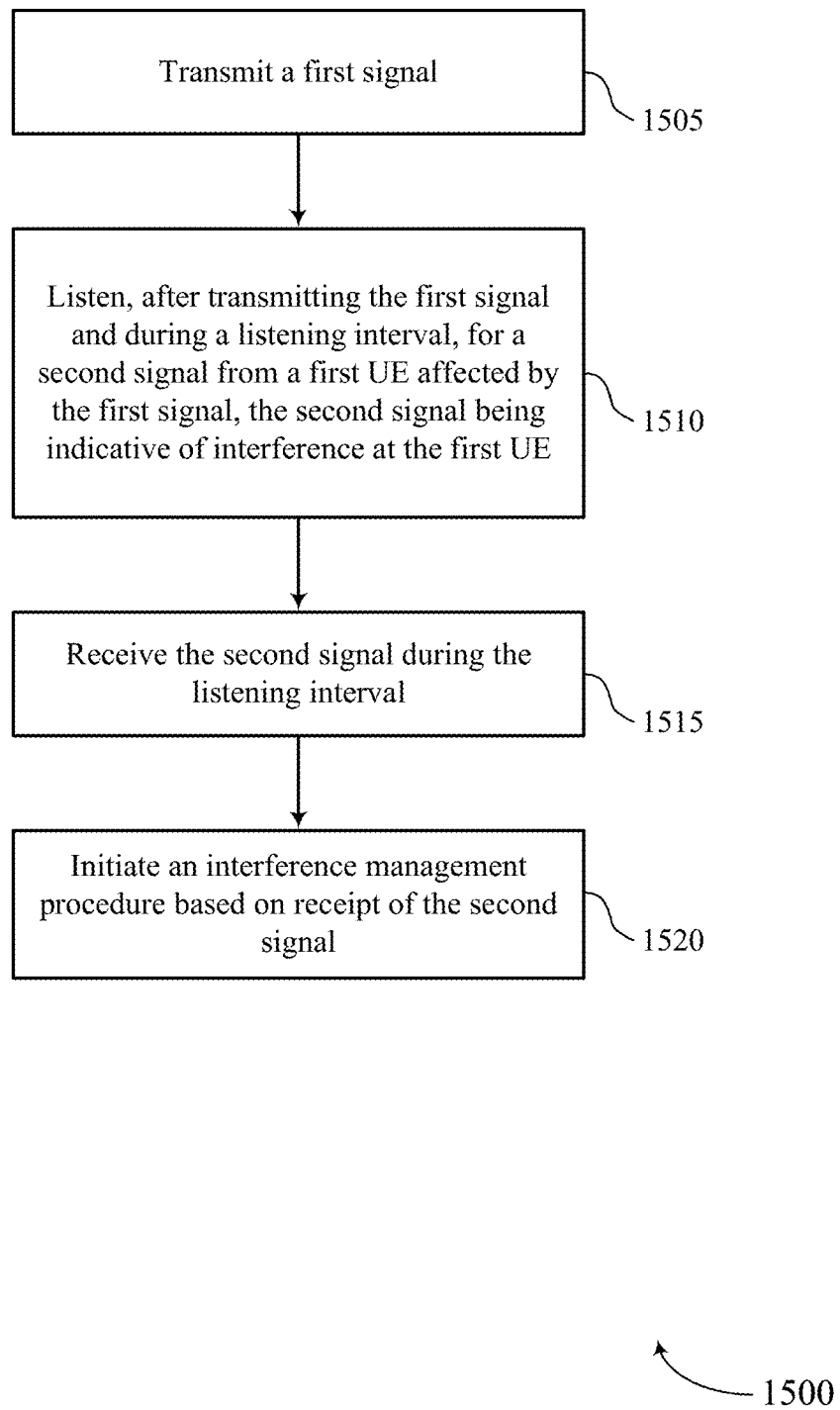
FIGS. 15 through 19 illustrate methods for interference management, in accordance with aspects of the present disclosure.

FIG. 15 shows a flowchart illustrating a method 1500 for interference management in accordance with aspects of the present disclosure. The operations of method 1500 may be implemented by a base station 105 or its components as described herein. For example, the operations of method 1500 may be performed by a base station interference manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may transmit a first signal. The operations of block 1505 may be performed according to the methods described herein. In certain examples, aspects of the operations of block 1505 may be performed by a transmitter as described with reference to FIGS. 7 through 10.

At block 1510 the base station 105 may listen, after transmitting the first signal and during a listening interval, for a second signal from a first user equipment (UE) affected by the first signal, the second signal being indicative of interference at the first UE. The operations of block 1510 may be performed according to the methods described herein. In certain examples, aspects of the operations of block 1510 may be performed by a listening component as described with reference to FIGS. 7 through 10.

At block 1515 the base station 105 may receive the second signal during the listening interval. The operations of block 1515 may be performed according to the methods described herein. In certain examples, aspects of the operations of block 1515 may be performed by a listening component as described with reference to FIGS. 7 through 10.

At block 1520 the base station 105 may initiate an interference management procedure based on receipt of the second signal. The operations of block 1520 may be performed according to the methods described herein. In certain examples, aspects of the operations of block 1520 may be performed by an interference component as described with reference to FIGS. 7 through 10.

Figure 16:
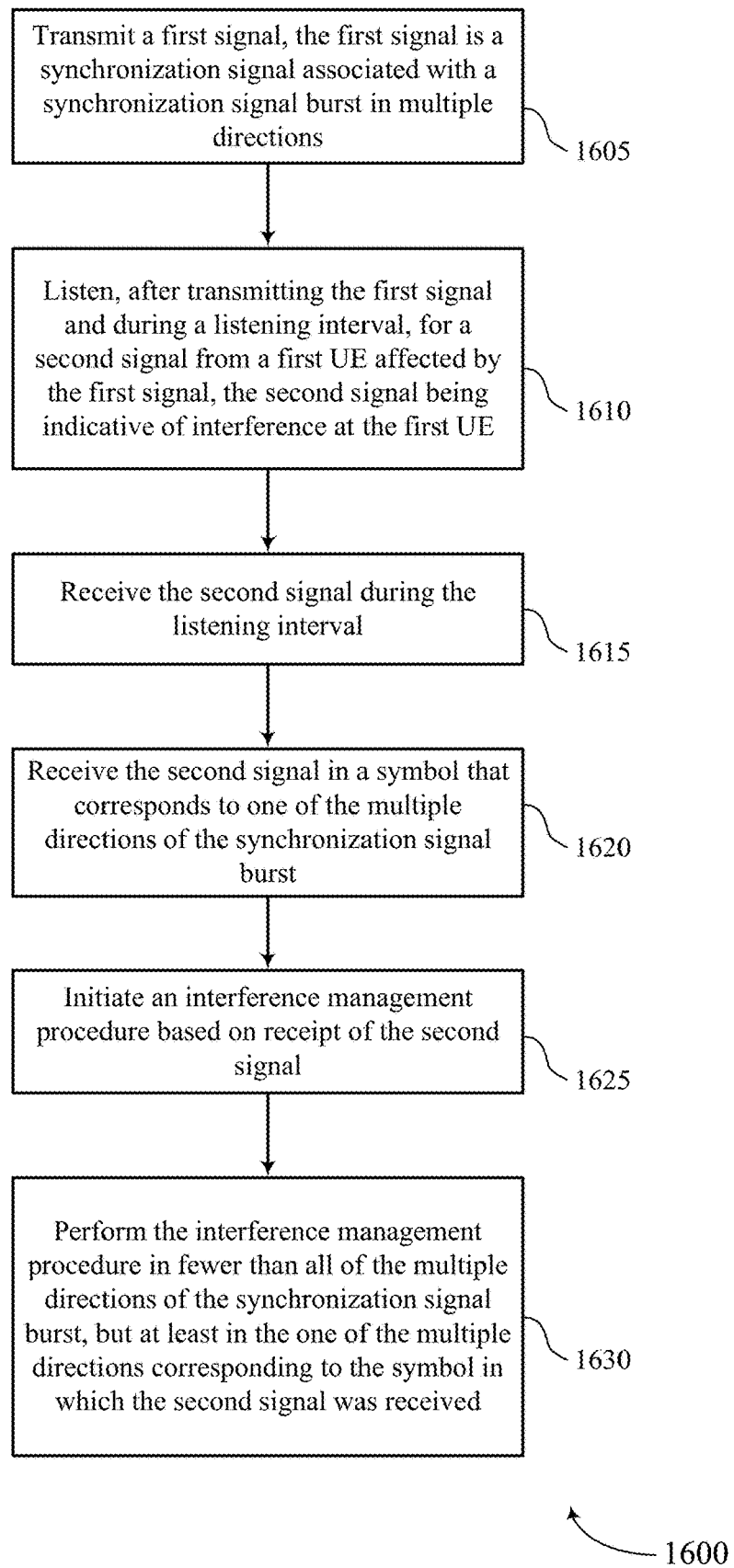

FIG. 16 shows a flowchart illustrating a method 1600 for interference management in accordance with aspects of the present disclosure. The operations of method 1600 may be implemented by a base station 105 or its components as described herein. For example, the operations of method 1600 may be performed by a base station interference manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may transmit a first signal, the first signal is a synchronization signal associated with a synchronization signal burst in multiple directions. The operations of block 1605 may be performed according to the methods described herein. In certain examples, aspects of the operations of block 1605 may be performed by a transmitter as described with reference to FIGS. 7 through 10.

At block 1610 the base station 105 may listen, after transmitting the first signal and during a listening interval, for a second signal from a first UE affected by the first signal, the second signal being indicative of interference at the first UE. The operations of block 1610 may be performed according to the methods described herein. In certain examples, aspects of the operations of block 1610 may be performed by a listening component as described with reference to FIGS. 7 through 10.

At block 1615 the base station 105 may receive the second signal during the listening interval. The operations of block 1615 may be performed according to the methods described herein. In certain examples, aspects of the operations of block 1615 may be performed by a listening component as described with reference to FIGS. 7 through 10.

At block 1620 the base station 105 may receive the second signal in a symbol that corresponds to one of the multiple directions of the synchronization signal burst. The operations of block 1620 may be performed according to the methods described herein. In certain examples, aspects of the operations of block 1620 may be performed by a listening component as described with reference to FIGS. 7 through 10.

At block 1625 the base station 105 may initiate an interference management procedure based on receipt of the second signal. The operations of block 1625 may be performed according to the methods described herein. In certain examples, aspects of the operations of block 1625 may be performed by an interference component as described with reference to FIGS. 7 through 10.

At block 1630 the base station 105 may perform the interference management procedure in fewer than all of the multiple directions of the synchronization signal burst, but at least in the one of the multiple directions corresponding to the symbol in which the second signal was received. The operations of block 1630 may be performed according to the methods described herein. In certain examples, aspects of the operations of block 1630 may be performed by an interference component as described with reference to FIGS. 7 through 10.

In some cases, the first signal is a synchronization signal associated with a synchronization signal burst in multiple directions.

Figure 17:
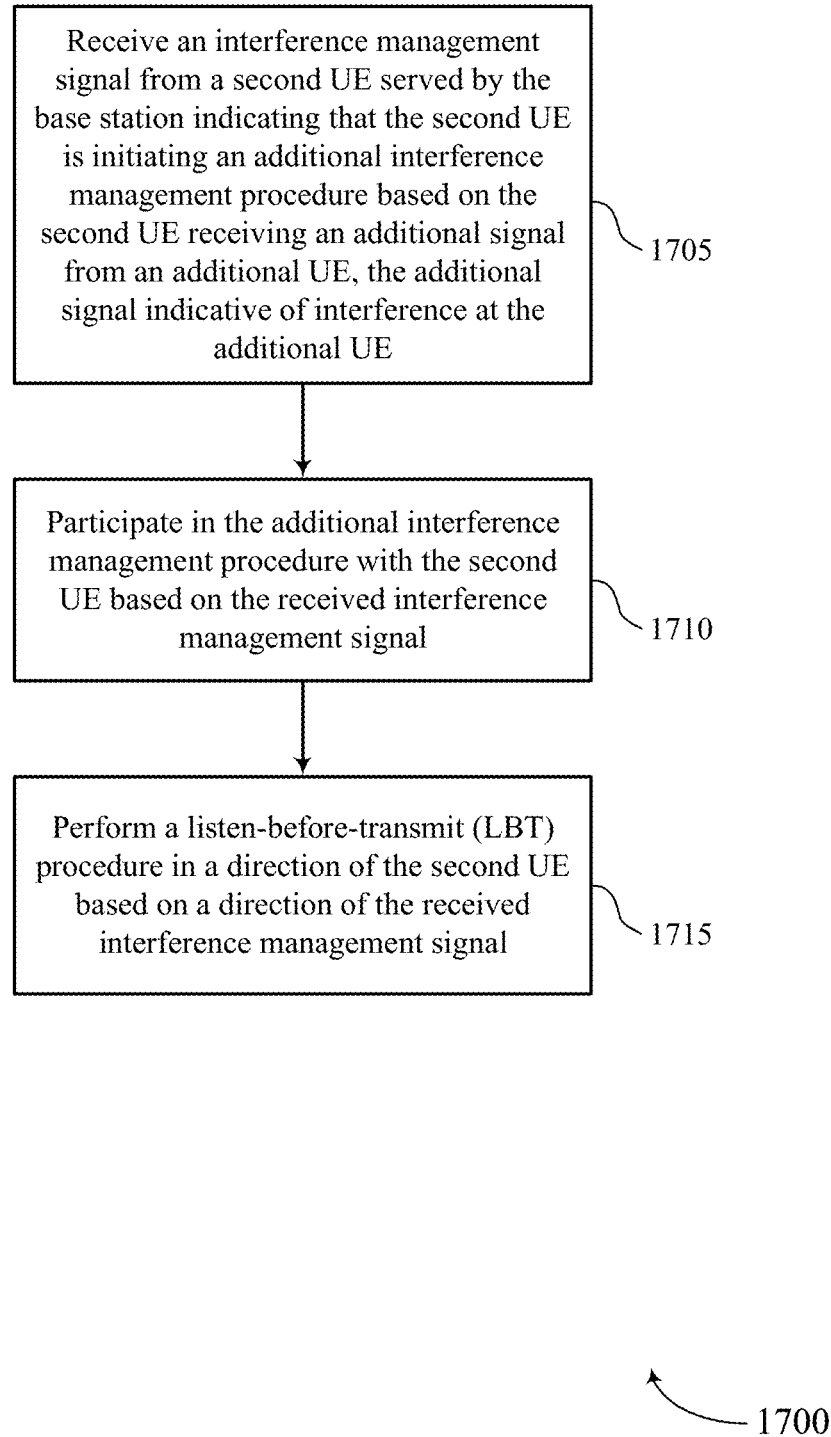

FIG. 17 shows a flowchart illustrating a method 1700 for on-demand interference management in accordance with aspects of the present disclosure. The operations of method 1700 may be implemented by a base station 105 or its components as described herein. For example, the operations of method 1700 may be performed by a base station interference manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may receive an interference management signal from a second UE served by the base station 105 indicating that the second UE is initiating an additional interference management procedure based on the second UE receiving an additional signal from an additional UE, the additional signal indicative of interference at the additional UE. The operations of block 1705 may be performed according to the methods described herein. In certain examples, aspects of the operations of block 1705 may be performed by an interference component as described with reference to FIGS. 7 through 10.

At block 1710 the base station 105 may participate in the additional interference management procedure with the second UE based on the received interference management signal. The operations of block 1710 may be performed according to the methods described herein. In certain examples, aspects of the operations of block 1710 may be performed by an interference component as described with reference to FIGS. 7 through 10.

At block 1715 the base station 105 may perform a listen-before-transmit (LBT) procedure in a direction of the second UE based on a direction of the received interference management signal. The operations of block 1715 may be performed according to the methods described herein. In certain examples, aspects of the operations of block 1715 may be performed by an interference component as described with reference to FIGS. 7 through 10.

Figure 18:
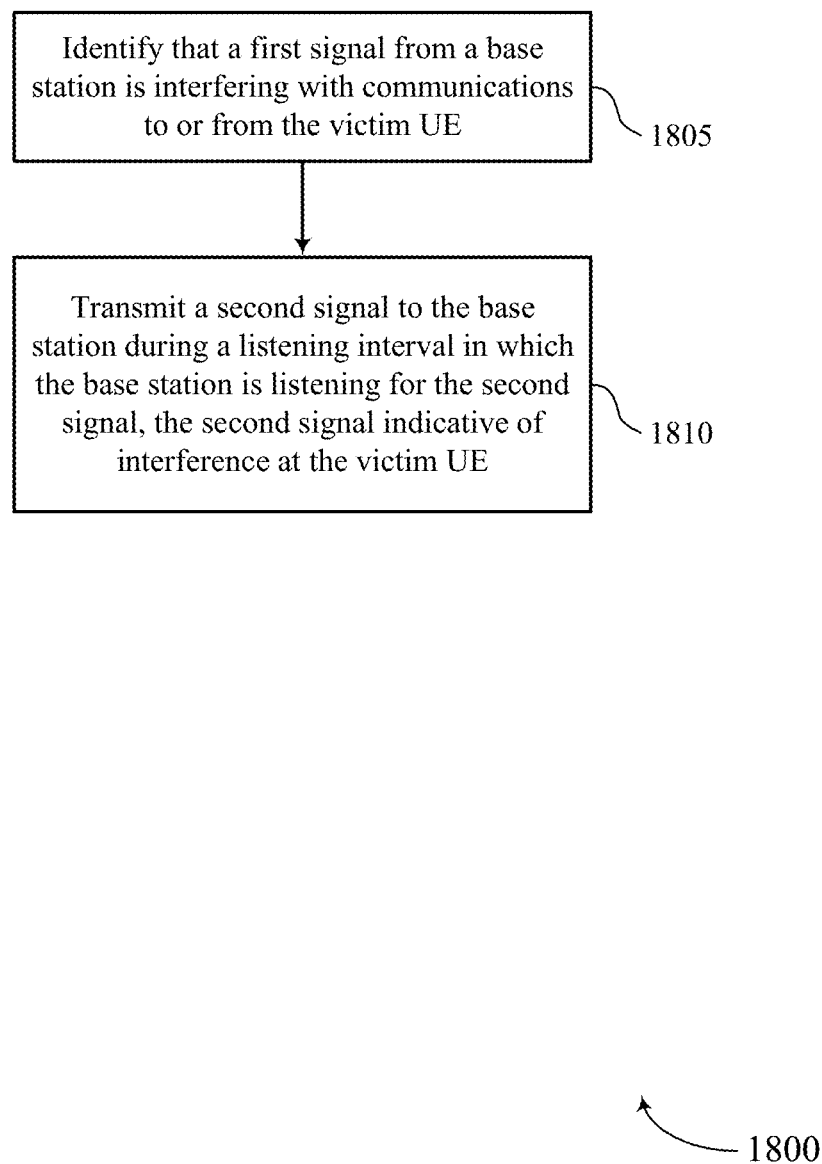

FIG. 18 shows a flowchart illustrating a method 1800 for interference management in accordance with aspects of the present disclosure. The operations of method 1800 may be implemented by a UE 115 or its components as described herein. For example, the operations of method 1800 may be performed by a UE interference manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may identify that a first signal from a base station is interfering with communications to or from the victim UE. The operations of block 1805 may be performed according to the methods described herein. In certain examples, aspects of the operations of block 1805 may be performed by an interference component as described with reference to FIGS. 11 through 14.

At block 1810 the UE 115 may transmit a second signal to the base station during a listening interval in which the base station is listening for the second signal, the second signal indicative of interference at the victim UE. The operations of block 1810 may be performed according to the methods described herein. In certain examples, aspects of the operations of block 1810 may be performed by a listening component as described with reference to FIGS. 11 through 14.

Figure 19:
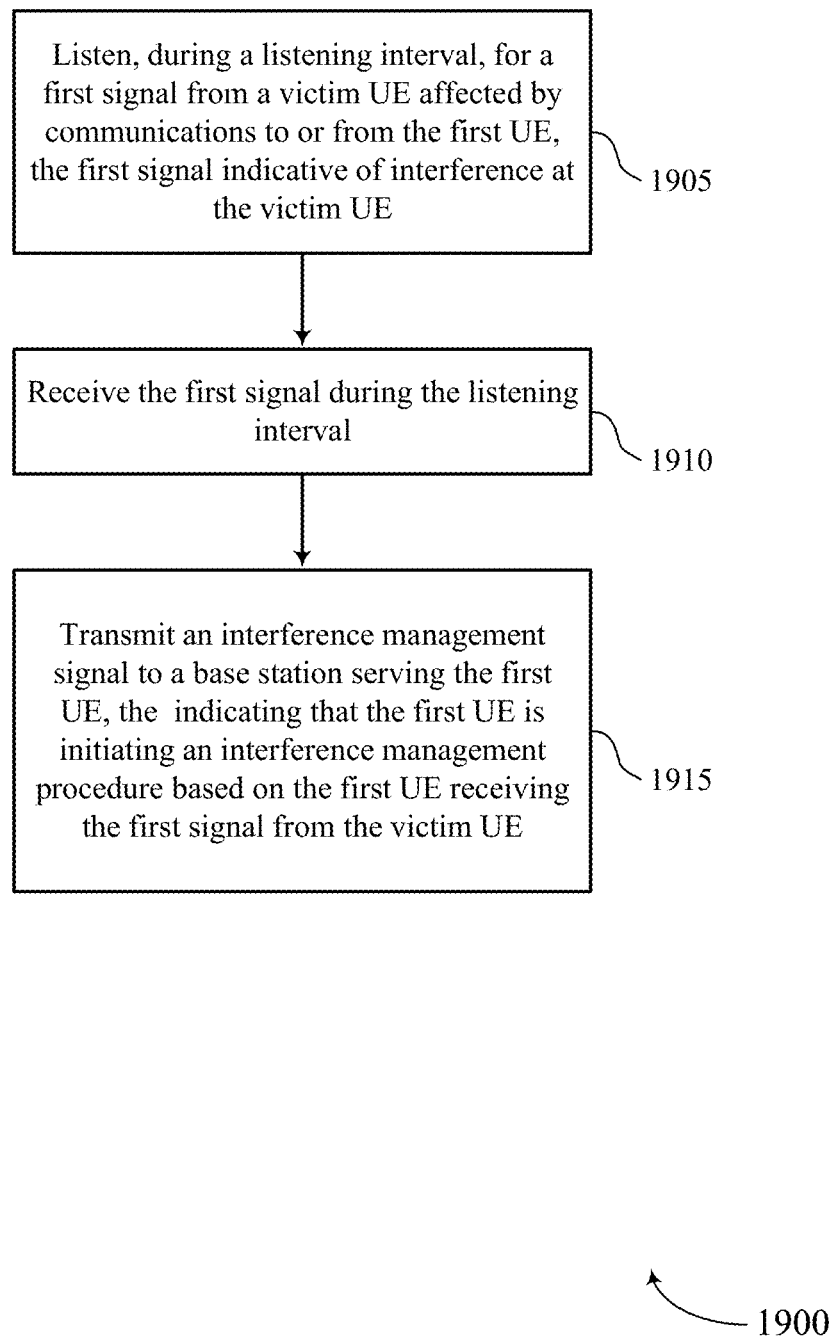

FIG. 19 shows a flowchart illustrating a method 1900 for interference management in accordance with aspects of the present disclosure. The operations of method 1900 may be implemented by a UE 115 or its components as described herein. For example, the operations of method 1900 may be performed by a UE interference manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may listen, during a listening interval, for a first signal from a victim UE affected by communications to or from the first UE, the first signal indicative of interference at the victim UE. The operations of block 1905 may be performed according to the methods described herein. In certain examples, aspects of the operations of block 1905 may be performed by a listening component as described with reference to FIGS. 11 through 14.

At block 1910 the UE 115 may receive the first signal during the listening interval. The operations of block 1910 may be performed according to the methods described herein. In certain examples, aspects of the operations of block 1910 may be performed by a listening component as described with reference to FIGS. 11 through 14.

At block 1915 the UE 115 may transmit an interference management signal to a base station serving the first UE, the interference management signal indicating that the first UE is initiating an interference management procedure based on the first UE receiving the first signal from the victim UE. The operations of block 1915 may be performed according to the methods described herein. In certain examples, aspects of the operations of block 1915 may be performed by an interference component as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
   transmitting a first signal;
   listening, after transmitting the first signal and during a listening interval, for a second signal from a first user equipment (UE) affected by the first signal, the second signal being indicative of interference at the first UE;
   receiving the second signal during the listening interval;
   initiating an interference management procedure based at least in part on receipt of the second signal; and
   refraining from transmitting to the first UE when the base station is in a contention mode based at least in part on receiving the second signal.

2. The method of claim 1, wherein the first signal is a synchronization signal associated with a synchronization signal burst in multiple directions.

3. The method of claim 2, wherein listening for the second signal further comprising:
   listening for the second signal in one or more symbols associated with the multiple directions of the synchronization signal burst.

4. The method of claim 2, wherein receiving the second signal comprises:
   receiving the second signal in a symbol that corresponds to one of the multiple directions of the synchronization signal burst.

5. The method of claim 4, wherein initiating the interference management procedure further comprising:
   performing the interference management procedure in fewer than all of the multiple directions of the synchronization signal burst, but at least in the one of the multiple directions corresponding to the symbol in which the second signal was received.

6. The method of claim 2, further comprising:
   determining an offset between the listening interval and the synchronization signal burst.

7. The method of claim 2, wherein the first signal is a synchronization signal transmitted using an assigned channel or during an assigned transmission time, or both.

8. The method of claim 7, wherein listening for the second signal further comprising:
   listening for the second signal using the assigned channel or during the listening interval which is associated with the assigned transmission time, or both.

9. The method of claim 1, wherein the first signal is a packet transmission, and wherein the listening interval is immediately after a transmission time interval of the first signal.

10. The method of claim 1, wherein the interference management procedure is performed in a direction, a frequency, or timing associated with the received second signal of the first UE.

11. A method for wireless communication at a base station, comprising:
    transmitting a first signal;
    listening, after transmitting the first signal and during a listening interval, for a second signal from a first user equipment (UE) affected by the first signal, the second signal being indicative of interference at the first UE;
    receiving the second signal during the listening interval; and
    initiating an interference management procedure based at least in part on receipt of the second signal, wherein the interference management procedure comprises a listen-before-transmit (LBT) procedure in a direction of the first UE based at least in part on a direction of the received second signal.

12. A method for wireless communication at a base station, comprising:
    transmitting a first signal;
    listening, after transmitting the first signal and during a listening interval, for a second signal from a first user equipment (UE) affected by the first signal, the second signal being indicative of interference at the first UE;
    receiving the second signal during the listening interval; and initiating an interference management procedure based at least in part on receipt of the second signal;
    receiving an interference management signal from a second UE served by the base station indicating that the second UE is initiating an additional interference management procedure based at least in part on the second UE receiving an additional signal from an additional UE, the additional signal indicative of interference at the additional UE; and
    participating in the additional interference management procedure with the second UE based at least in part on the received interference management signal.

13. The method of claim 12, further comprising:
    performing a listen-before-transmit (LBT) procedure in a direction of the second UE based at least in part on a direction of the received interference management signal.

14. A method for wireless communication at a base station, comprising:
    transmitting a first signal;
    listening, after transmitting the first signal and during a listening interval, for a second signal from a first user equipment (UE) affected by the first signal, the second signal being indicative of interference at the first UE;
    receiving the second signal during the listening interval; and
    initiating an interference management procedure based at least in part on receipt of the second signal; and
    wherein receiving the second signal comprises updating a transmission timer for the interference management procedure based at least in part on a receive time of the second signal during the listening interval.

15. The method of claim 14, wherein the first signal is a synchronization signal associated with a synchronization signal burst in multiple directions.

16. A method for wireless communication at a victim user equipment (UE), comprising:
    identifying that a first signal from a base station is interfering with communications to or from the victim UE; and
    transmitting a second signal to the base station during a listening interval in which the base station is listening for the second signal, the second signal indicative of interference at the victim UE, wherein the second signal comprises a registration response (RRS) signal.

17. The method of claim 16, wherein transmitting the second signal to the base station further comprising:
    transmitting the second signal in a symbol associated with a direction of the first signal.

18. The method of claim 16, wherein identifying that the first signal from the base station is interfering with communications to or from the victim UE further comprising:
    determining that the first signal or the communications to or from the victim UE satisfy a threshold value.

19. The method of claim 18, wherein the threshold value is associated with a signal interference to noise ratio (SINR) value or a signal to noise ratio (SNR) of the communications to or from the victim UE.

20. The method of claim 18, wherein transmitting the second signal to the base station is based at least in part on the first signal satisfying the threshold value.

21. The method of claim 16, wherein the second signal comprises an interference power associated with a measurement in the RRS.

22. The method of claim 16, wherein the first signal is associated with a synchronization signal burst.

23. The method of claim 22, wherein identifying that the first signal from the base station is interfering with communications to or from the victim UE is based at least in part on performing a radio resource monitoring (RRM) measurement of the synchronization signal burst.

24. An apparatus for wireless communication, comprising:
a processor;
memory in electronic communication with the processor; and
instructions stored in the memory and operable, when executed by the processor, to cause the apparatus to:
transmit a first signal;
listen, after transmitting the first signal and during a listening interval, for a second signal from a first user equipment (UE) affected by the first signal, the second signal being indicative of interference at the first UE;
receive the second signal during the listening interval, wherein receiving the second signal comprises updating a transmission timer for the interference management procedure based at least in part on a receive time of the second signal during the listening interval; and
initiate an interference management procedure based at least in part on receipt of the second signal.

25. The apparatus of claim 24, wherein the first signal is a synchronization signal associated with a synchronization signal burst in multiple directions.

26. The apparatus of claim 24, wherein the instructions for listening for the second signal are further executable by the processor to:
listen for the second signal in one or more symbols associated with the multiple directions of the synchronization signal burst.

* * * * *